(12) United States Patent
Lee et al.

(10) Patent No.: US 8,081,374 B2
(45) Date of Patent: Dec. 20, 2011

(54) DISPLAY DEVICE

(75) Inventors: Son-Uk Lee, Yongin-si (KR); Nam-Seok Roh, Seongnam-si (KR); Sang-Il Kim, Yongin-si (KR); Sung-Jin Kim, Seongnam-si (KR); Tae-Hyung Hwang, Seoul (KR)

(73) Assignee: Samsung Electronics Co., Ltd., Suwon-Si, Gyeonggi-Do (KR)

( * ) Notice: Subject to any disclaimer, the term of this patent is extended or adjusted under 35 U.S.C. 154(b) by 211 days.

(21) Appl. No.: 12/416,783

(22) Filed: Apr. 1, 2009

(65) Prior Publication Data

US 2010/0053727 A1    Mar. 4, 2010

(30) Foreign Application Priority Data

Sep. 3, 2008 (KR) .................. 10-2008-0086896

(51) Int. Cl.
*G02B 5/20* (2006.01)
(52) U.S. Cl. ..................................... 359/295
(58) Field of Classification Search ........... 359/290–297
See application file for complete search history.

(56) References Cited

U.S. PATENT DOCUMENTS

| | | | |
|---|---|---|---|
| 6,008,877 A * | 12/1999 | Akiyama et al. | 349/147 |
| 6,147,790 A | 11/2000 | Meier et al. | |
| 6,532,093 B2 | 3/2003 | Sun et al. | |
| 7,050,126 B2 * | 5/2006 | Schrader et al. | 349/57 |
| 7,768,595 B2 * | 8/2010 | Chang | 349/66 |
| 2007/0216987 A1 | 9/2007 | Hagood et al. | |
| 2008/0037104 A1 * | 2/2008 | Hagood et al. | 359/292 |

FOREIGN PATENT DOCUMENTS

| | | |
|---|---|---|
| JP | 09-092909 | 4/1997 |
| JP | 2005-070091 | 3/2005 |
| JP | 2006-259272 | 9/2006 |
| JP | 2006-346817 | 12/2006 |
| JP | 2007-024947 | 2/2007 |
| KR | 1020020010322 | 2/2002 |
| KR | 102006004590 | 1/2006 |
| KR | 100606409 | 7/2006 |
| KR | 1020060134914 | 12/2006 |
| KR | 100685940 | 2/2007 |

OTHER PUBLICATIONS

English Abstract for Publication No. 09-092909, Apr. 1997.
English Abstract for Publication No. 1020020010322, Feb. 2002.
English Abstract for Publication No. 2005-070091, Mar. 2005.
English Abstract for Publication No. 1020060004590, Jan. 2006.
English Abstract for Publication No. 100606409, Jul. 2006.
English Abstract for Publication No. 2006-259272, Sep. 2006.
English Abstract for Publication No. 2006-346817, Dec. 2006.
English Abstract for Publication No. 1020060134914, Dec. 2006.
English Abstract for Publication No. 2007-024947, Feb. 2007.
English Abstract for Publication No. 100685940, Feb. 2007.

* cited by examiner

*Primary Examiner* — Scott J Sugarman
*Assistant Examiner* — Vipin Patel
(74) *Attorney, Agent, or Firm* — F. Chau & Associates, LLC

(57) ABSTRACT

A flat panel display device displays an image using a micro-shutter electrode and a diffusive reflection layer. The display device has a wide viewing angle and reduces a loss of light to thus improve light efficiency. In addition, gray levels can be determined by an electrostatic force between the pixel electrode and the micro-shutter electrode. An opening/closing operation of the micro-shutter electrode is fast so that the response speed can be improved.

18 Claims, 17 Drawing Sheets

DISPLAY DEVICE

CROSS-REFERENCE TO RELATED APPLICATION

This application claims priority from Korean Patent Application No. 10-2008-0086896 filed in the Korean Intellectual Property Office on Sep. 3, 2008, the entire contents of which are herein incorporated by reference.

BACKGROUND OF THE INVENTION (a) Field of the Invention

The present disclosure is directed to a display device and, more particularly, to a new type of transmissive display device.

(b) Discussion of the Related Art

Display devices have evolved from cathode ray tube (CRT) devices to flat panel display devices such as a liquid crystal displays (LCDs), plasma display panels (PDPs), and the like. The CRT display device displays images by allowing electron beams to collide with a fluorescent material (e.g., phosphor). The CRT display device is disadvantageous in that an increase in its screen size is accompanied by an increase in its depth, making it difficult to enlarge the display device.

Thus, to overcome such shortcomings, a plurality of flat panel display devices have been developed. Of them, the LCD and the PDP are typical flat panel display devices. The flat panel display devices are advantageous in that the devices can be increased in size without increasing their depth, so that they can be hung on a wall.

However, the LCD has a slow response speed, and the PDP consumes much power.

Thus, to address these issues of existing flat panel display devices, there is a need to develop a new type of flat panel display device.

SUMMARY OF THE INVENTION

Embodiments of the present invention provide a flat panel display device with a new structure using a micro-shutter electrode and a diffusive reflection layer.

An exemplary embodiment of the present invention provides a display device including: a first substrate; a pixel electrode formed on the first substrate and made of a transparent conductive material; a protrusion formed to be adjacent to the pixel electrode and having a reflection face; a diffusive reflection layer formed on the protrusion and diffusively reflecting incident light; and a micro-shutter electrode moved by an electrostatic force with the pixel electrode and reflecting incident light.

The diffusive reflection layer may be formed as a white reflection film obtained by depositing a powder such as silicon oxide, aluminum oxide, or the like.

The micro-shutter electrode may have a fixed end with a convex structure.

The micro-shutter electrode may have a fixed end, and the fixed end may be connected by a connection ring.

The connection ring may be made of an elastic material such as silicon.

Gray levels may be displayed according to an opening and closing degree of the micro-shutter electrode.

A gray level may be represented by controlling a time interval duration during which the micro-shutter electrode is open.

The display device may further include a backlight unit including a light source at an outer side of the first substrate.

The display device may further include a light-recycle layer formed below the pixel electrode and the protrusion on the first substrate to reflect incident light to the backlight unit. The light-recycle layer may be made of a metal or may be formed as a white reflection film obtained by depositing a powder such as silicon oxide, aluminum oxide, or the like.

The backlight unit may include red, blue, and green light sources, and each light source may be operated at different intervals.

The device may further include a second substrate facing the first substrate, a color filter formed on the second substrate, and a black matrix formed at a region on the second substrate where the color filter is not formed.

The micro-shutter electrode may be positioned above the pixel electrode on the first substrate.

The device may further include a layer made of the same material as that of the diffusive reflection layer on the micro-shutter electrode.

The device may further include a layer formed between the protrusion and the diffusive reflection layer and made of the same material as that of the micro-shutter electrode.

The device may further include a passivation layer formed between the pixel electrode and the micro-shutter electrode.

The micro-shutter electrode may be positioned below the second substrate and above the pixel electrode.

The device may further include a light absorption layer formed on the first substrate where the pixel electrode is not formed.

One or more micro-shutter electrodes may be formed per pixel.

Another embodiment of the present invention provides a display device including: a first substrate; a pixel electrode formed on the first substrate and made of a transparent conductive material; a protrusion formed to be adjacent to the pixel electrode and having a reflection face with a depressed portion and an embossed portion; and a micro-shutter electrode moved by an electrostatic force with the pixel electrode and reflecting incident light.

The display device may be driven in an active mode in which signals are transferred by using switching elements formed at respective pixels, or driven in a passive mode in which pixels selected by selecting a horizontal axis and a vertical axis of pixels are driven without a switching element for each pixel.

Yet another embodiment of the present invention provides a method for manufacturing a display device, including: coating an insulation material on a first substrate and patterning the insulation material to form an electrode structure; stacking a metal layer on the electrode structure; and lifting off the electrode structure.

The method may further include removing the metal layer formed on one of inclined planes of the electrode structure between the stacking of the metal layer and the lifting-off of the electrode structure.

The method may further include forming a protrusion with a reflection face is at the side of the electrode structure when forming the electrode structure, and stacking the metal layer on the protrusion when stacking the metal layer on the electrode structure, and forming a white reflection film on the electrode structure and the protrusion after stacking the metal layer on the electrode structure and before lifting-off the electrode structure.

The method may further include removing the metal layer and the white reflection film formed on one of inclined planes of the electrode structure after forming the white reflection film and before lifting-off the electrode structure.

A depression portion and an embossed portion may be formed on the reflection face of the protrusion.

The white reflection film may be formed by depositing a powder such as silicon oxide, aluminum oxide, or the like.

The method may further include forming a color filter covering pattern for covering the color filter may be formed at the side of the electrode structure, and stacking the metal layer on the color filter covering pattern.

The method may further include: coating an insulation material on a second substrate facing the first substrate and patterning the coated insulation material to form a protrusion and a pixel electrode covering pattern; forming a white reflection film on the protrusion and the pixel electrode covering pattern; and lifting off the pixel electrode covering pattern.

The white reflection film may be formed by depositing a powder such as silicon oxide, aluminum oxide, or the like.

The electrode structure may have a protrusion structure formed at one end thereof.

The method may further include forming a micro-shutter electrode with a convex structure corresponding to the protrusion structure.

A display device according to the present invention is a flat panel display device with a micro-shutter electrode and a diffusive reflection layer, which improves luminance by enhancing efficiency of light used for displaying images. Gray levels may be determined by electrostatic forces between the pixel electrode and the micro-shutter electrode, and because the opening/closing operation of the micro-shutter electrode is fast, the response speed can be improved.

DETAILED DESCRIPTION OF EXEMPLARY EMBODIMENTS

Figure 1:
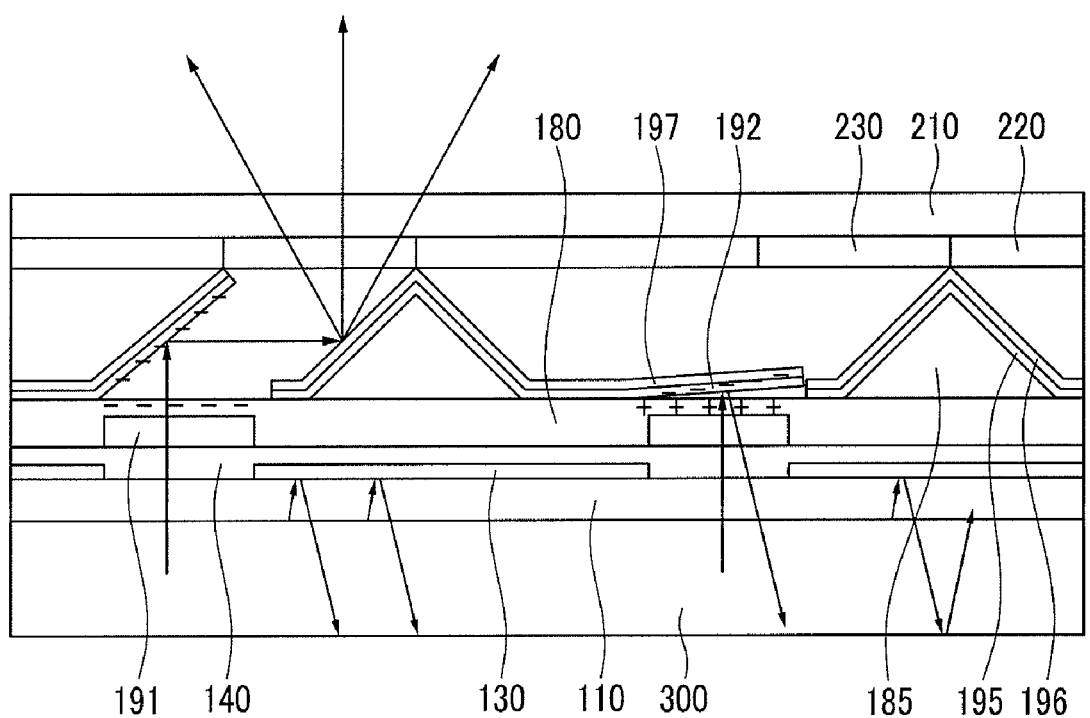
FIG. 1 is a cross-sectional view of a display device according to an embodiment of the present invention.

Embodiments of the present invention will be described more fully hereinafter with reference to the accompanying drawings, in which exemplary embodiments of the invention are shown. As those skilled in the art would realize, the described embodiments may be modified in various different ways, all without departing from the spirit or scope of the present invention.

In the drawings, the thickness of layers, films, panels, regions, etc., may be exaggerated for clarity. Like reference numerals designate like elements throughout the specification. It will be understood that when an element such as a layer, film, region, or substrate is referred to as being "on" another element, it can be directly on the other element or intervening elements may also be present A display device according to an embodiment of the present invention will now be described in detail with reference to FIG. 1.

FIG. 1 is a cross-sectional view of a display device according to an embodiment of the present invention in which one micro-shutter is open and another micro-shutter is almost closed.

The display device can be divided into a display panel and a backlight unit 300. The display panel includes a lower substrate 110 and an upper substrate 210 formed at outermost portions thereof, and a thin film transistor (not shown), a pixel electrode 191, a micro-shutter electrode 192, a diffusive reflection layer 196, a color filter 230, a black matrix 220, and the like, are formed between the lower substrate 110 and the upper substrate 210. The backlight unit 300 necessarily includes a light source, and may further include a light guide plate (not shown), a reflection plate (not shown), and the like, according to embodiments of the invention.

The display panel including the elements of the present invention will now be described in detail.

The display panel according to an embodiment of the present invention includes the upper substrate 210 and the lower substrate 110.

A light-recycle layer 130 is formed on the lower substrate 110. The light-recycle layer 130 blocks light emitted from the backlight unit 300 that is incident to an unused portion of the display, and returns it to the backlight unit 300. The light returned to the backlight unit 300 is again reflected from the reflection plate (not shown) of the backlight unit 300 to be incident to the display panel again. Thus, light efficiency can be increased. The light-recycle layer 130 may be formed as a metal layer or as a white reflection film formed by depositing a powder such as silicon oxide ($SiO_2$), aluminum oxide ($Al_2O_3$), or the like. The white reflection film has better reflection efficiency than the metal layer.

In addition to the light-recycle layer 130, a gate line (not shown), a data line (not shown), and a thin film transistor (TFT) (not shown) are formed on the lower substrate 110. The light-recycle layer 130 may be formed together when the gate line and the data line are formed, and the gate line and the data line may also serve as the light-recycle layer 130 according to other embodiments of the invention.

An insulating layer 140 is formed to cover the gate line, the data line, the TFT, and the light-recycle layer 130, and includes a contact hole (not shown) exposing a drain electrode of the TFT.

A pixel electrode 191 is formed on the insulating layer 140 and is connected with the TFT via the contact hole. The pixel electrode 191 is formed of a transparent conductor such as indium tin oxide (ITO), indium zinc oxide (IZO), or the like.

A passivation layer 180 is formed on the pixel electrode 191. The passivation layer 180 may be formed over the entire region of the lower substrate.

The micro-shutter electrodes 192, protrusions 185, and the diffusive reflection layer 196 are formed on the passivation layer 180.

The micro-shutter electrodes 192 are formed at positions corresponding to the pixel electrodes 191, and may be moved by an electrostatic force with the pixel electrodes 191. In this case, the micro-shutter electrodes 192 may be formed such that the regions corresponding to the pixel electrodes 191 can be opened or closed. The micro-shutter electrode 192 may be formed as a thin metal layer to mirror-reflect light that has passed through the transparent pixel electrode 191. White (or a maximum luminance of a corresponding color) or black may be displayed according to the position of the micro-shutter electrode 192. A layer 197 made of the same material as the diffusive reflection layer 196 may be formed on the micro-shutter electrodes 192. The layer 197 is formed in a fabrication process and may be omitted according to other embodiments of the invention.

Each protrusion 185 is formed at a region that does not correspond to a pixel electrode 191 on the passivation layer 180. The protrusion 185 is made of an insulating material and has a triangular structure with at least one inclined plane. In an exemplary embodiment of the invention, although the section has a triangular cross-section, a side (i.e., the right inclined plane of the protrusion 185 in FIG. 1) that is not used for image display is not sloped. On the other hand, a side (i.e., the left inclined plane of the protrusion 185 in FIG. 1, hereinafter referred to as a "reflection face") used for displaying an image may be an inclined plane formed at an angle. The reflection face may have various shapes according to the operational shape of the micro-shutter electrode 192.

A layer 195 made of the same material as the micro-shutter electrode 192 is formed on a same side of the protrusion 185 on which the diffusive reflection layer 196 is formed. The layer 195 is formed in the same process as the micro-shutter electrode 192, and may be omitted according to other embodiments of the invention. Unlike the micro-shutter electrode 192 that mirror-reflects light, the diffusive reflection layer 196 diffusively reflects light. Specifically, the diffusive reflection layer 196 can distributedly reflect light in various directions, to thus improve a viewing angle of the display device. The diffusive reflection layer 196 may be formed as a white reflection film obtained by depositing a powder such as silicon oxide ($SiO_2$) or aluminum oxide ($Al_2O_3$).

The structure including the protrusion 185 and the diffusive reflection layer 196 may serve as a spacer that uniformly maintains the space with the upper substrate 210 as shown in FIG. 1, and an extra spacer may be additionally formed according to other embodiments of the invention.

The black matrix 220 and the color filter 230 are formed on the upper substrate 210. The color filter 230 is formed at a portion through which light that has been reflected from the diffusive reflection layer 196 mostly passes, to add a color to the corresponding light. Thus, the color filter 230 may be formed at a position corresponding to the structure of the protrusion 185 and the diffusive reflection layer 196.

The black matrix 220 is formed at a region where the color filter 230 is not formed, blocks light incident from the outside, and eliminates light that is not required for image display.

The color filter 230, the black matrix 220, and the upper substrate 210 have a structure similar to that of a liquid crystal display (LCD), so the upper substrate used in the LCD can be used.

Also, the backlight unit 300 is similar to that of the LCD, so the backlight unit used in the LCD can also be used as is. In this respect, in an exemplary embodiment of the invention, a film is not required below the lower substrate 110, reducing fabrication unit cost compared with the LCD.

A method according to an embodiment of the invention for forming each layer on the lower substrate 110 will now be described with reference to FIGS. 2 to 7.

FIGS. 2 to 7 show a method of forming each layer on a lower substrate of the display device according to an embodiment of the present invention.

Figure 2:
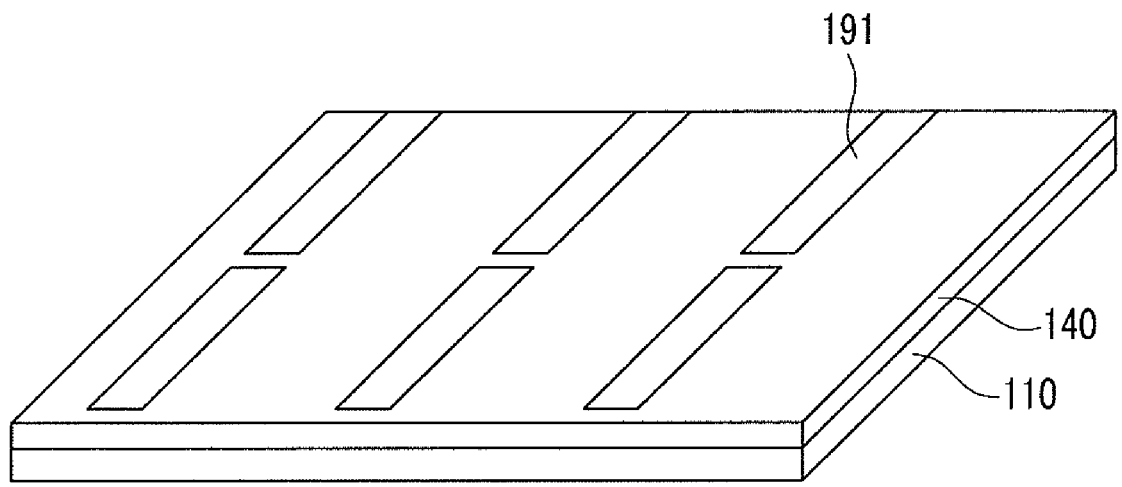
FIGS. 2 to 7 show a method of forming each layer on a lower substrate of a display device according to an embodiment of the present invention.

FIG. 2 shows that the gate line, the data line, the TFT, and the light-recycle layer 130 (hidden by the insulating layer 140) are formed on the lower substrate 110 on which the insulating layer 140 is stacked, and the contact hole (not shown) exposing the drain electrode of the TFT is formed on the insulating layer 140 and the pixel electrode 191 is formed on the insulating layer 140. The pixel electrode 191 is formed to be connected with the TFT via the contact hole, and is formed as a transparent conductor such as ITO or IZO.

Figure 3:
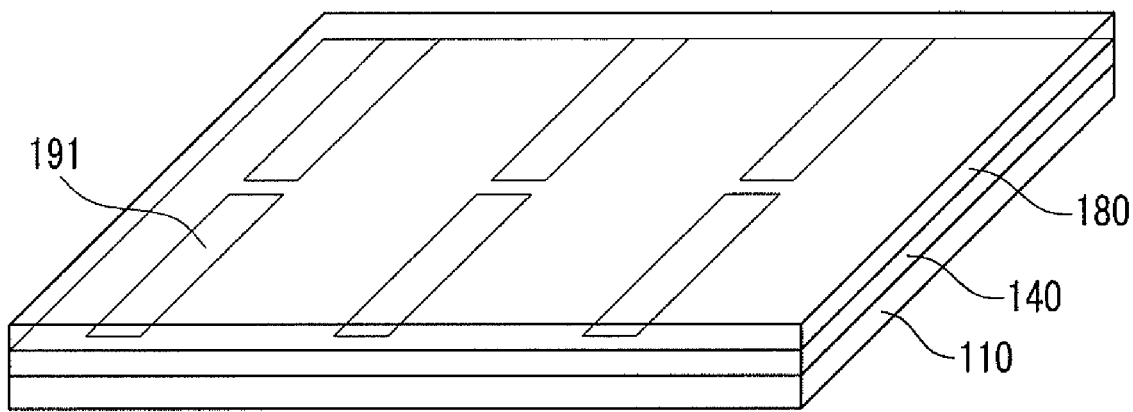

FIG. 3 shows the passivation layer 180 covering the pixel electrode 191. The passivation layer 180 may be formed as an inorganic insulating layer or an organic insulating layer. In this respect, to form the protrusions 185 on the passivation layer 180, the passivation layer 180 may have a smooth upper surface, so the organic insulating layer may be formed as the passivation layer 180.

Figure 4:
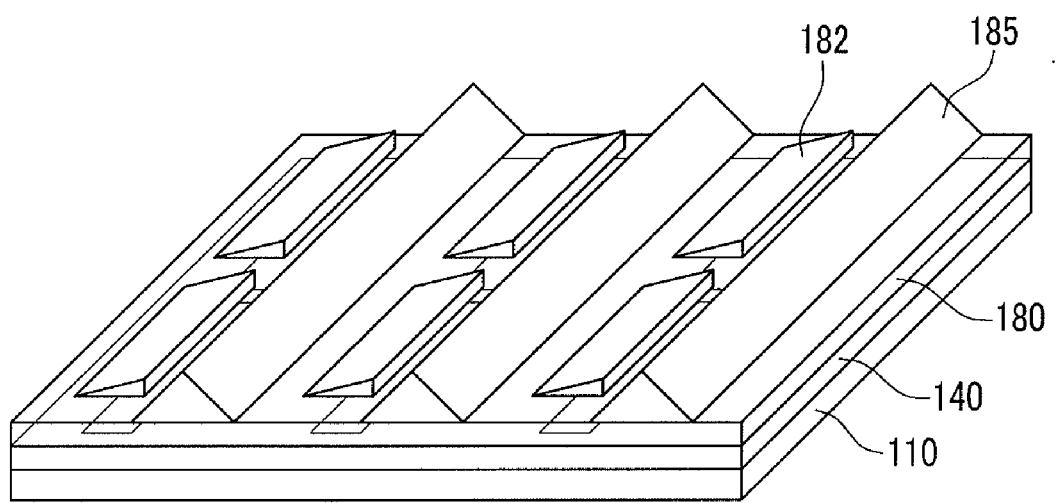
Figure 7:
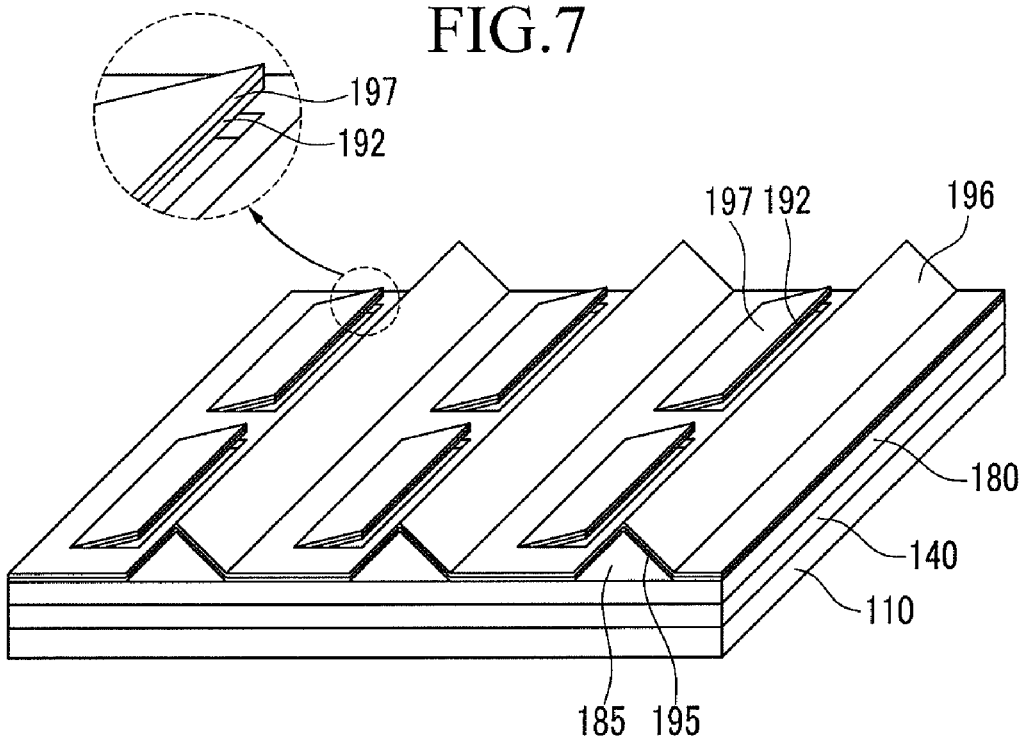

FIG. 4 shows a method of forming the protrusions 185, in which an insulating material is stacked on the passivation layer 180 and then patterned to form the protrusions 185 and electrode structures 182 formed at the positions where the micro-shutter electrodes 192 are to be formed. The electrode structure 182 has a triangular sectional structure with a long hypotenuse and a vertical side. The vertical side of the electrode structure 182 may be excessively etched through overetching to have a reverse-tapered structure. This is because, when the electrode structure 182 is removed, a metal material should not be stacked on the vertical side, as shown in FIG. 7. For the reverse-tapered structure, the electrode structure 182 may be additionally dry-etched after being patterned. The protrusion 185 may be formed according to various methods such as an imprinting method, a photolithography method, a gravure method, and the like.

Figure 5:
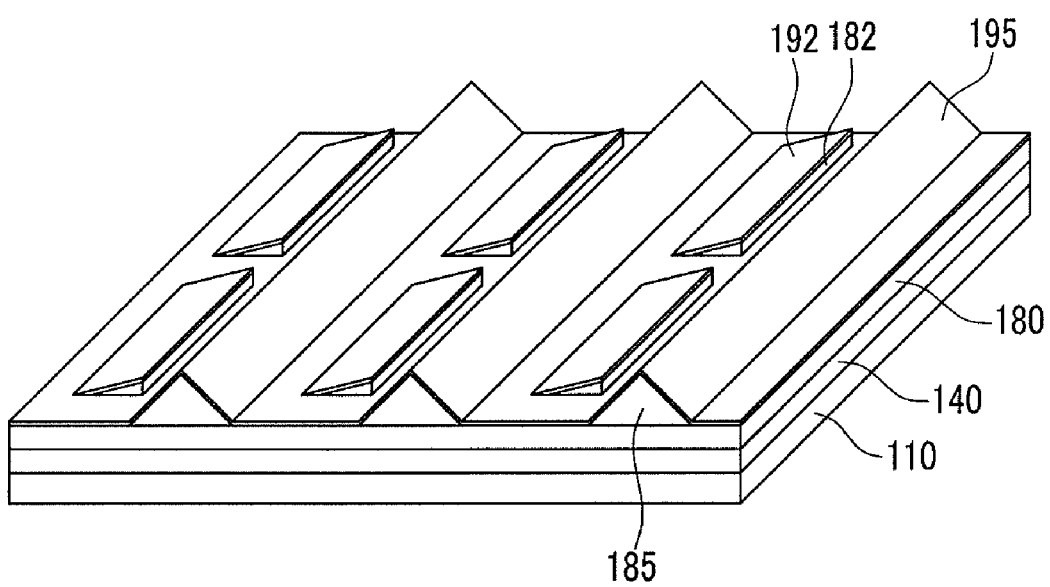

Thereafter, as shown in FIG. 5, a metal material is stacked to form the micro-shutter electrode 192 and the layer 195 made of the same material as the micro-shutter electrode 192. The micro-shutter electrode 192 is formed on the long inclined plane of the electrode structure 182.

Figure 6:
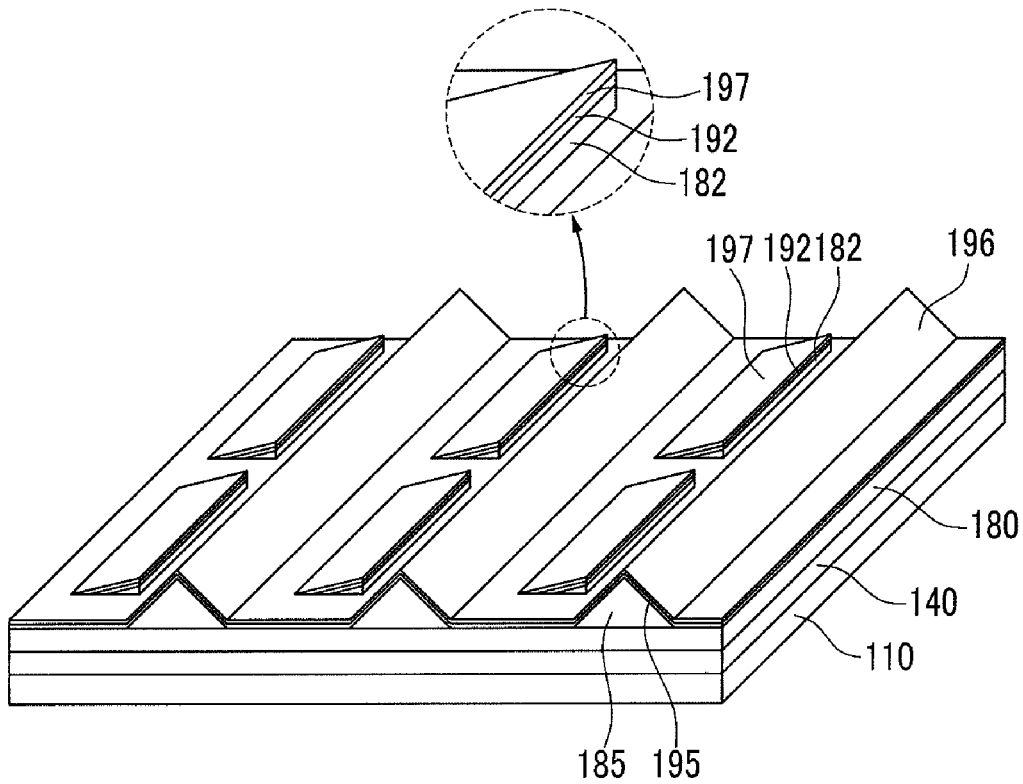

Thereafter, as shown in FIG. 6, the white reflection film is formed by depositing a powder such as silicon oxide ($SiO_2$) or aluminum oxide ($Al_2O_3$). The white reflection film is formed on the protrusion 185 and the layer 195 to form the diffusive reflection layer 196. The white reflection film is also formed on the micro-shutter electrode 192.

In steps as shown in FIGS. 5 and 6, the material stacked on the electrode structure 182 may be formed only on the longer inclined plane of the electrode structure 182, but in the actual process, each layer may be formed on the shorter inclined plane. In this case, a step of removing the layers formed on the shorter inclined plane through etching may be additionally performed (see FIG. 26).

Thereafter, as shown in FIG. 7, the insulating material used for forming the protrusion 184 is removed by reflowing or the like. Then, the protrusion 185 remains, but the electrode structure 182 formed under the micro-shutter electrode 192 is removed, allowing the micro-shutter electrode 192 to move.

A method for representing gray levels in a display device according to an embodiment of the invention formed as described above will now be described with reference to FIGS. 8 to 10.

Figure 8:
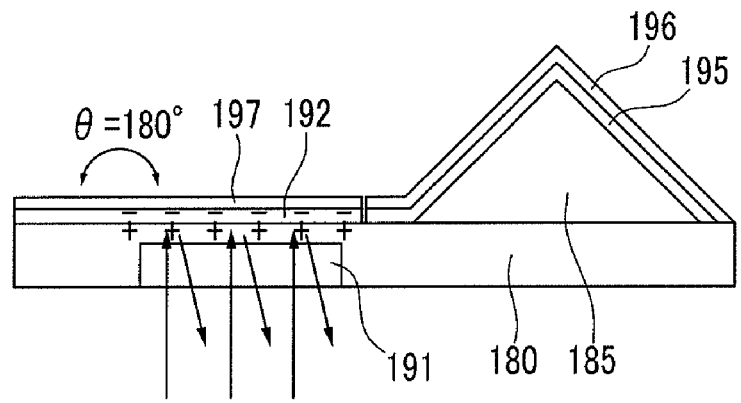
FIG. 8 is a cross-sectional view showing a state of a micro-shutter electrode when black is displayed in the embodiment of FIG. 1.
Figure 9:
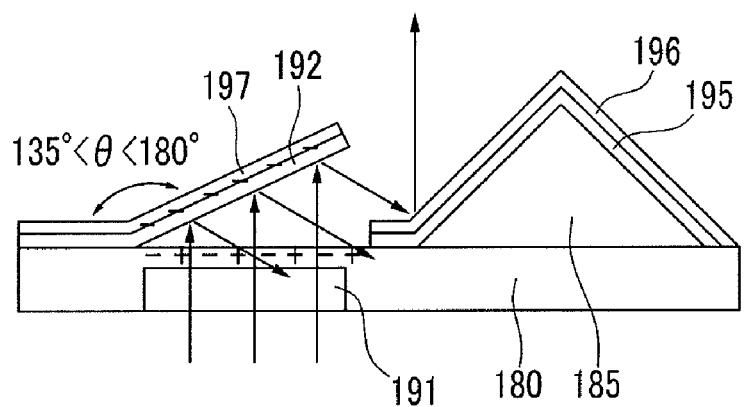
FIG. 9 is a cross-sectional view showing a state of the micro-shutter electrode when a gray scale of a certain level is represented in the embodiment of FIG. 1.
Figure 10:
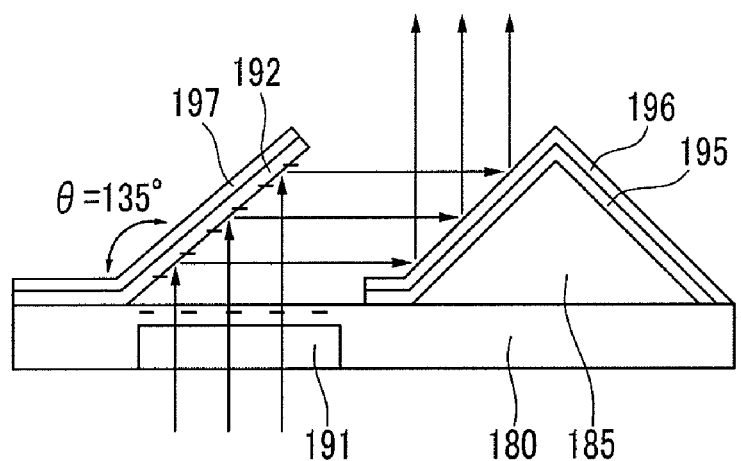
FIG. 10 is a cross-sectional view showing a state of the micro-shutter electrode when white is displayed in the embodiment of FIG. 1.

FIG. 8 is a cross-sectional view showing a state of the micro-shutter electrode when black is displayed in the embodiment of FIG. 1, FIG. 9 is a cross-sectional view showing a state of the micro-shutter electrode when a gray level is represented in the embodiment of FIG. 1, and FIG. 10 is a cross-sectional view showing a state of the micro-shutter electrode when white is displayed in the embodiment of FIG. 1.

First, FIG. 8 shows the case of displaying black.

The micro-shutter electrode 192 is positioned to be as close as possible to the passivation layer 180 due to electromagnetic attraction between the micro-shutter electrode 192 and the pixel electrode 191. Hereinafter, this is called a case where the micro-shutter electrode 192 is closed. As a result, light emitted from the backlight unit 300 transmits through the pixel electrode 191 but is mirror-reflected by the micro-shutter electrode 192, failing to further proceed upwardly. Thus, there is no light emitted at the upper portion of the display device, and accordingly black is displayed.

FIGS. 9 and 10 show a case where the micro-shutter electrode 192 is open to display of a gray level and white, respectively.

In the display device according to an exemplary embodiment of the invention, the gray levels may be represented depending on the degree of opening of the micro-shutter electrode 192 according to an electrostatic force between the micro-shutter electrode 192 and the pixel electrode 191. When the micro-shutter electrode 192 is slightly open as shown in FIG. 9, light that has passed through the pixel electrode 191 is reflected from the micro-shutter electrode 192, of which one portion is returned to the backlight unit 300 while another portion is made incident on the diffusive reflection layer 196 to be discharged upwardly at less than a maximum luminance. An image is displayed with the discharged light.

If the micro-shutter electrode 192 is completely open as shown in FIG. 10, the light that has passed through the pixel electrode 191 is reflected from the micro-shutter electrode 192 to be upwardly discharged. As a result, a maximum luminance (white) is displayed. When white is displayed, a repulsive electrostatic force is maximized between the micro-shutter electrode 192 and the pixel electrode 191. FIG. 10 shows an exemplary angle of 135° for the micro-shutter electrode 192 is maximally open, but the angle may vary according to other embodiments of the invention.

FIGS. 8 to 10 show the micro-shutter electrode 192 negatively charged, but without being limited thereto, the micro-shutter electrode 192 may be positively charged according to other embodiments of the invention. The same charges as those on the micro-shutter electrode 192 may be applied to the pixel electrode 191 to display white, while different charges may be applied to the pixel electrode 191 to display black.

Figure 11:
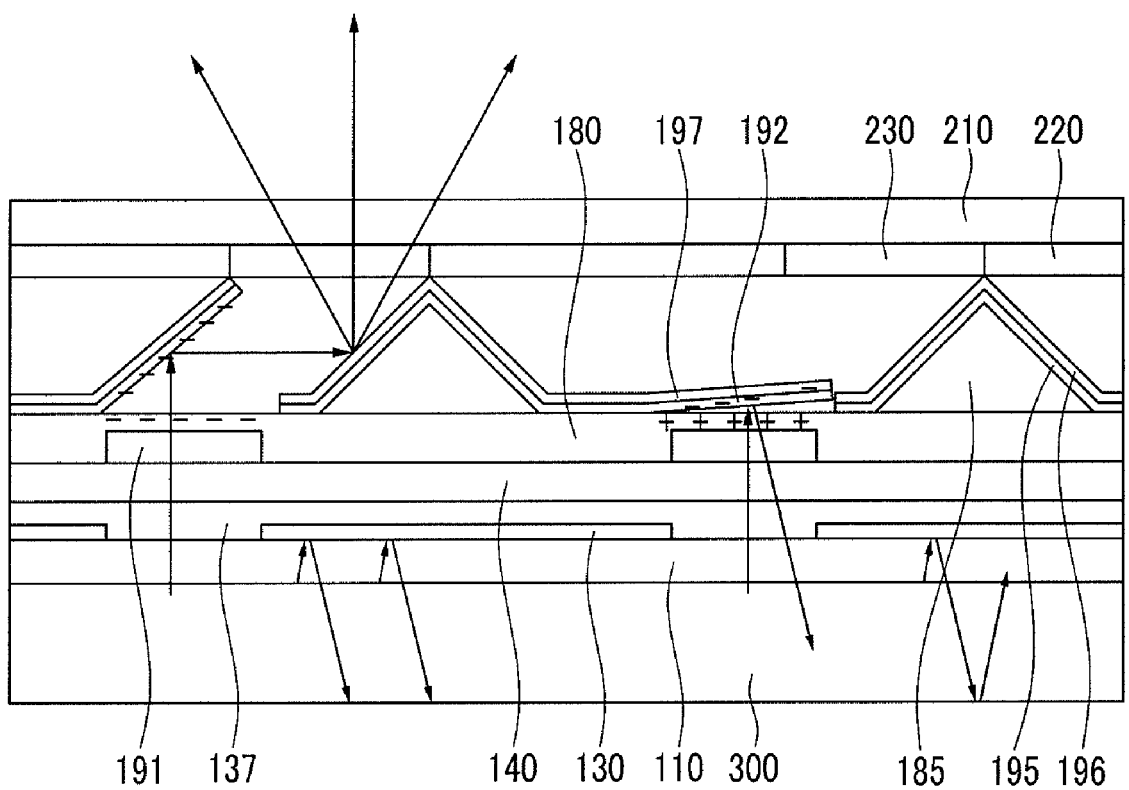
FIG. 11 is a cross-sectional view of a display device according to another embodiment of the present invention.

FIG. 11 is a cross-sectional view of a display device according to another embodiment of the present invention.

Unlike the embodiment of FIG. 1, in the present exemplary embodiment of FIG. 11, the light-recycle layer 130 is formed separately from a gate line and a data line.

The light-recycle layer 130 is formed on the lower substrate 110. The light-recycle layer 130 blocks light emitted from the backlight unit 300 and incident to an unused portion of the display, and returns it to the backlight unit 300. The light returned to the backlight unit 300 is again reflected from the reflection plate (not shown) of the backlight unit 300 to be incident to the display panel again. Thus, light efficiency can be increased. The light-recycle layer 130 may be formed as a metal layer or as a white reflection film formed by depositing a powder such as silicon oxide ($SiO_2$), aluminum oxide ($Al_2O_3$), or the like. The white reflection film has better reflection efficiency than the metal layer.

A light-recycle insulating layer 137 is formed on the light-recycle layer 130 to cover the light-recycle layer 130. The light-recycle insulating layer may be formed on the entire region of the lower substrate 110, and is formed as an inorganic insulating layer or an organic insulating layer.

In addition to the light-recycle layer 130, a gate line (not shown), a data line (not shown), and a TFT (not shown) are formed on the light-recycle insulating layer 137. In an exemplary embodiment of the invention, the light-recycle layer 130 is separately formed with respect to the gate line, the data line, and the TFT, and the respective elements play only their own roles.

The insulating layer 140 is formed on the gate line, the data line, and the TFT, covering them, and includes a contact hole (not shown) exposing a drain electrode of the TFT.

The pixel electrode 191 is formed on the insulating layer 140 and is connected with the TFT via the contact hole. The pixel electrode 191 is formed as a transparent conductor such as ITO or IZO, and a data voltage is applied to the pixel electrode 191 via the TFT.

The passivation layer 180 is formed on the pixel electrode 191. The passivation layer 180 may be formed over the entire region of the lower substrate.

The micro-shutter electrode 192 and the protrusion 185 are formed on the passivation layer 180, and the diffusive reflection layer 196 is formed on the protrusion 185.

The micro-shutter electrodes 192 are formed at positions corresponding to the pixel electrode 191, and may be moved by an electrostatic force with the pixel electrode 191. In this case, the micro-shutter electrode 192 may be formed at the region corresponding to the pixel electrode 191, so that the region can be opened or closed. The micro-shutter electrode 192 is formed as a thin metal layer to mirror-reflect light that has passed through the transparent pixel electrode 191. White (or a maximum luminance of the corresponding color) or black may be displayed according to the position of the micro-shutter electrode 192. The layer 197 made of the same material as the diffusive reflection layer 196 may be formed on the micro-shutter electrode 192. The layer 197 is formed from a fabrication process and may be omitted according to other embodiments of the invention.

Each protrusion 185 is formed at a region that does not correspond to the pixel electrode 191 on the passivation layer 180. The protrusion 185 is made of an insulating material and has a triangular structure with at least one hypotenuse. In an exemplary embodiment of the invention, although the section has the triangular cross-section, the side (i.e., the right inclined plane of the protrusion 185 in FIG. 11) that is not used for an image display is not sloped. On the other hand, the side (i.e., the left inclined plane of the protrusion 185 in FIG. 11, hereinafter referred to as a "reflection face") used for displaying an image may be an inclined plane formed at an angle. The reflection face may have various shapes according to the operational shape of the micro-shutter electrode 192.

The layer 195 made of the same material as the micro-shutter electrode 192 is formed on a same side of the protrusion 185 on which the diffusive reflection layer 196 is formed. The layer 195 is formed in a same process as the micro-shutter electrode 192, and may be omitted according to other embodiments of the invention. Unlike the micro-shutter electrode 192 that mirror-reflects light, the diffusive reflection layer 196 diffusively reflects light. Specifically, the diffusive reflection layer 196 can distributedly reflect light in various directions, to thus improve a viewing angle of the display device. The diffusive reflection layer 196 may be formed as a white reflection film obtained by depositing a powder such as silicon oxide ($SiO_2$) or aluminum oxide ($Al_2O_3$).

The structure including the protrusion 185 and the diffusive reflection layer 196 may serve as a spacer that uniformly maintains the space with the upper substrate 210 as shown in FIG. 11, and an extra spacer may be additionally formed according to other embodiments of the invention.

The black matrix 220 and the color filter 230 are formed on the upper substrate 210. The color filter 230 is formed at a portion through which light that has been reflected from the diffusive reflection layer 196 mostly passes, to add a color to the corresponding light. Thus, the color filter 230 may be formed at a position corresponding to the structure of the protrusion 185 and the diffusive reflection layer 196.

The black matrix 220 is formed at a region where the color filter 230 is not formed, blocks light incident from the outside, and eliminates light that is not required for image display.

The color filter 230, the black matrix 220, and the upper substrate 210 have a structure similar to that of a liquid crystal display (LCD), so the upper substrate used in the LCD can be used.

Also, the backlight unit 300 is similar to that of the LCD, so the backlight unit used in the LCD can also be used as is. In this respect, in an exemplary embodiment of the invention, a film is not required below the lower substrate 110, reducing fabrication unit cost compared with the LCD.

As described above, in the exemplary embodiment of FIG. 11, the light-recycle layer 130 is formed to be separated from the layer in which the gate line, the data line, and the TFT are formed, and the respective elements play only their own role.

According to another embodiment of the invention, the micro-shutter electrode may be formed on the upper substrate 210. Hereinafter, an embodiment thereof will be described in detail with reference to FIG. 12.

Figure 12:
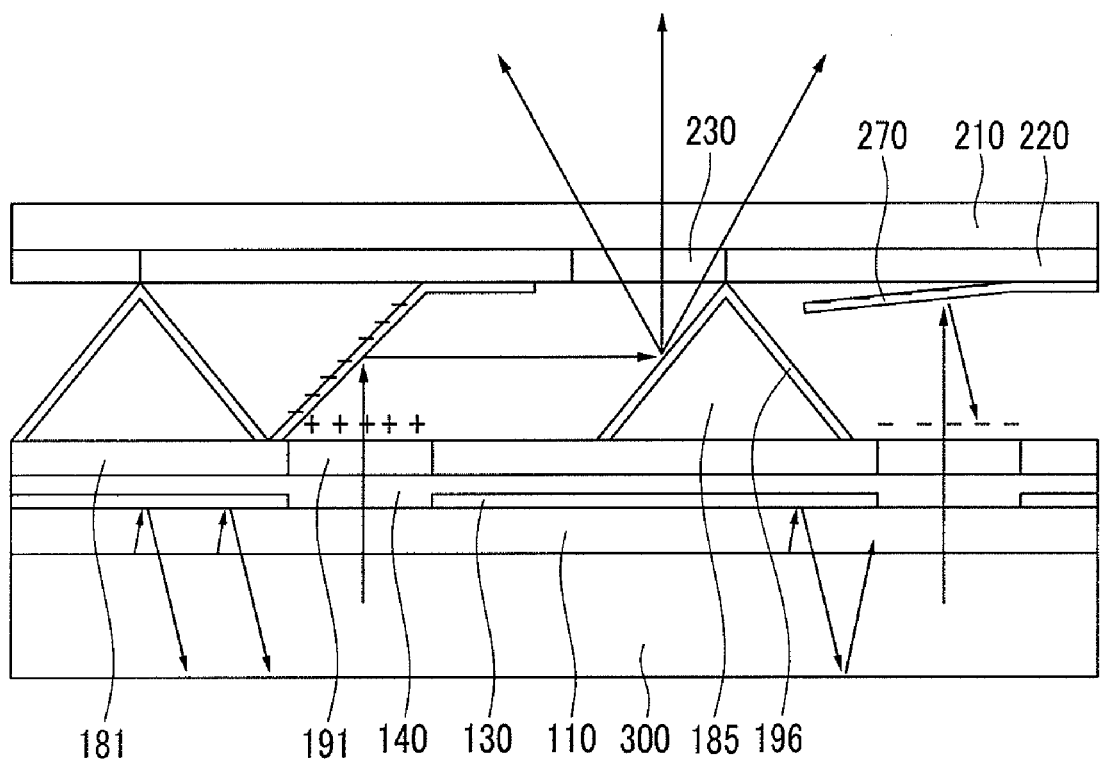
FIG. 12 is a cross-sectional view of a display device according to still another embodiment of the present invention in which one micro-shutter is open and another micro-shutter is almost closed.

FIG. 12 is a cross-sectional view of a display device according to another embodiment of the present invention in which one micro-shutter is open and another micro-shutter is almost closed.

A display device according to an exemplary embodiment of the invention may be divided into the display panel and the backlight unit 300. The display panel includes the lower substrate 110 and the upper substrate 210 formed at the outermost portions thereof, and a thin film transistor (not shown), a pixel electrode 191, a diffusive reflection layer 196, a micro-shutter electrode 270, a color filter 230, a black matrix 220, and the like, are formed between the lower substrate 110 and the upper substrate 210. The backlight unit 300 necessarily includes a light source, and may further include a light guide plate (not shown), a reflection plate (not shown), and the like, according to embodiments.

A display panel according to an embodiment of the present invention will now be described in detail.

A display panel according to the embodiment of the present invention includes the upper substrate 210 and the lower substrate 110.

A light-recycle layer 130 is formed on the lower substrate 110. The light-recycle layer 130 blocks light emitted from the backlight unit 300 and incident to an unused portion of the display, and returns it to the backlight unit 300. The light returned to the backlight unit 300 is again reflected from the reflection plate (not shown) of the backlight unit 300 to be incident to the display panel again. Thus, light efficiency can be increased. The light-recycle layer 130 may be formed as a metal layer or as a white reflection film formed by depositing a powder such as silicon oxide ($SiO_2$), aluminum oxide ($Al_2O_3$), or the like. The white reflection film has better reflection efficiency than the metal layer.

In addition to the light-recycle layer 130, a gate line (not shown), a data line (not shown), and a thin film transistor (TFT) (not shown) are formed on the lower substrate 110. The light-recycle layer 130 may be formed together when the gate line and the data line are formed, and the gate line and the data line may also serve as the light-recycle layer 130 according to other embodiments of the invention.

The insulating layer 140 is formed to cover the gate line, the data line, the TFT, and the light-recycle layer 130, and includes a contact hole (not shown) exposing a drain electrode of the TFT.

The pixel electrode 191 is formed on the insulating layer 140 and is connected with the TFT via the contact hole. The pixel electrode 191 is formed as a transparent conductor such as indium tin oxide (ITO), indium zinc oxide (IZO), or the like, and a data voltage is applied to the pixel electrode via the TFT.

A light absorption layer 181 is formed on the insulating layer 140 at a region where the pixel electrode 191 is not formed. The light absorption layer 181 may be formed with the same material as the black matrix 220 of the upper substrate 210, and absorbs incident light.

The protrusion 185 and the diffusive reflection layer 196 are formed on the light absorption layer 181.

The protrusion 185 is made of an insulating material, and has a triangular cross section with at least one hypotenuse. Although the section has the triangular cross section, the side (i.e., the right inclined plane of the protrusion 185 in FIG. 12) that is not used for an image display is not sloped. On the other hand, the side (i.e., the left inclined plane of the protrusion 185 in FIG. 12, hereinafter referred to as a "reflection face") used for displaying an image may be an inclined plane formed at an angle. The reflection face may have various shapes according to other embodiments of the invention.

The diffusive reflection layer 196 is formed on the protrusion 185. Unlike using mirror-reflection to reflect incident light in one direction, the diffusive reflection layer 196 can distributedly reflect incident light in various directions. As a result, the viewing angle of the display device can be improved. The diffusive reflection layer 196 may be formed as a white reflection film obtained by depositing a powder such as silicon oxide ($SiO_2$) or aluminum oxide ($Al_2O_3$).

The structure including the protrusion 185 and the diffusive reflection layer 196 may serve as a spacer that uniformly maintains the space with the upper substrate 210 as shown in FIG. 12, and an extra spacer may be additionally formed according to other embodiments of the invention.

The black matrix 220, the color filter 230, and the micro-shutter electrode 270 are formed on the upper substrate 210.

The color filter 230 is formed at a position corresponding to the reflection face of the structure including the protrusion 185 and the diffusive reflection layer 196, and allows light reflected from the reflection face to mostly pass therethrough. In addition, the color filter 230 adds a color to the light that passes therethrough.

The black matrix 220 is formed at a region where the color filter 230 is not formed, blocks light incident from the outside, and eliminates light that is not required for image display.

The micro-shutter electrode 270 is formed under the black matrix 220. The micro-shutter electrode 270 is not formed on the color filter 230.

The micro-shutter electrode 270 is formed at an upper region of the pixel electrode 191, and may be moved by an electrostatic force with the pixel electrode 191. In this case, the micro-shutter electrodes 270 may be formed to open and close at the upper region of the pixel electrodes 191. The micro-shutter electrode 270 may be formed as a thin metal layer to mirror-reflect light that has passed through the transparent pixel electrode 191. White (or a maximum luminance of a corresponding color) or black may be displayed according to the opening/closing degree of the micro-shutter electrode 270.

The backlight unit 300 is similar to that of the LCD, so the backlight unit used in the LCD can also be used as is. In this respect, a film is not required below the lower substrate 110, reducing fabrication unit cost compared with the LCD.

A method of forming the respective layers of the display device according to the embodiment of FIG. 12 will now be described with reference to FIGS. 13 to 20. FIGS. 13 to 16 show a method of forming the respective layers of the lower substrate of the display device according to the embodiment of FIG. 12, and FIGS. 17 to 20 show a method of forming the respective layers on the upper substrate of the display device according to the embodiment of FIG. 12.

First, the method of forming the respective layers on the lower substrate 110 will be described.

FIGS. 13 to 16 show a method of forming the respective layers of the lower substrate of the display device according to the embodiment of FIG. 12.

Figure 13:
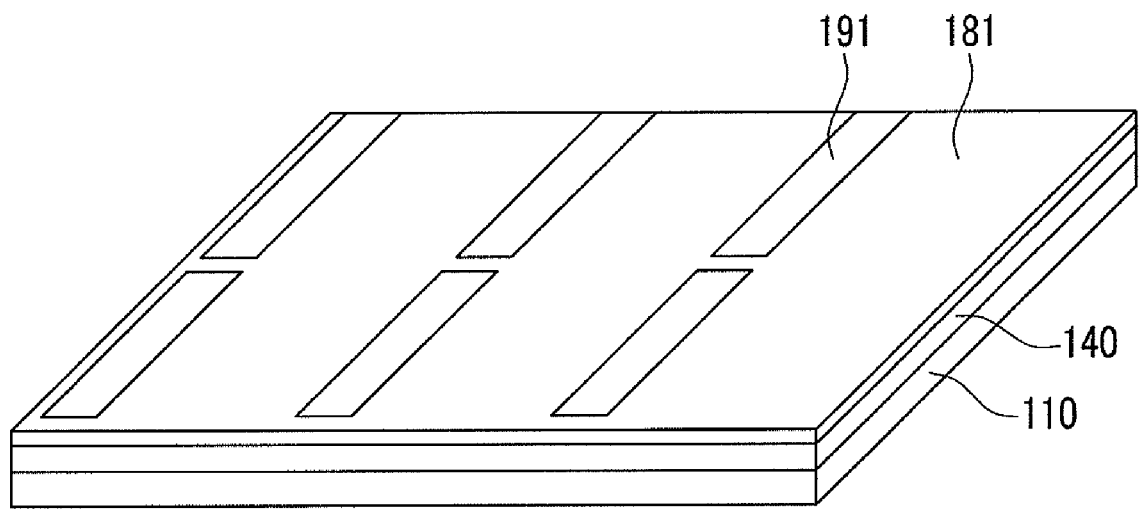
FIGS. 13 to 16 show a method of forming each layer of a lower substrate of the display device according to the embodiment of FIG. 12.

With reference to FIG. 13, the gate line, the data line, the TFT, and the light-recycle layer 130 (hidden by the insulating layer 140) are formed on the lower substrate 110, on which the insulating layer 140 is stacked to cover them. The contact hole (not shown) exposing the drain electrode of the TFT is formed on the insulating layer 140, and then the pixel electrode 191 is formed on the insulating layer 140. The light absorption layer 181 is formed at a region where the pixel electrode 191 is not formed. The pixel electrode 191 is formed to be connected with the TFT via the contact hole, and is formed of the transparent conductor such as ITO or IZO. The light absorption layer 181 may be made of the same material as the black matrix 220, and absorbs incident light.

Figure 14:
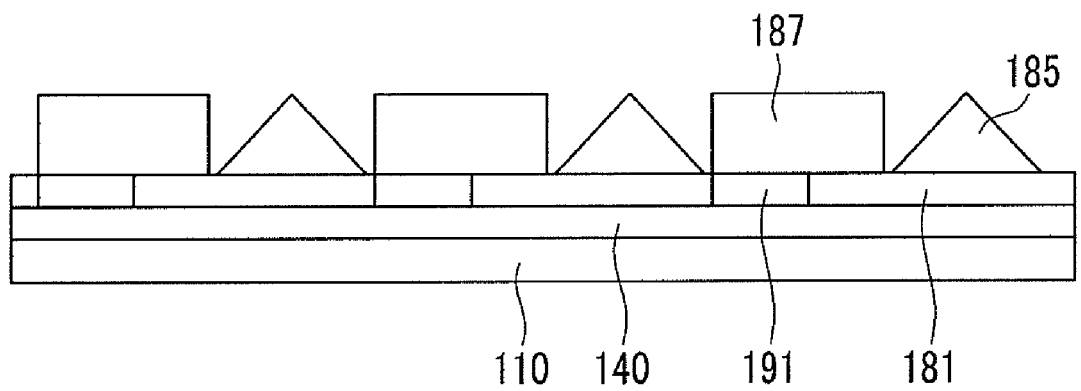

FIG. 14 shows a method of forming the protrusion 185. An insulating material is stacked on the pixel electrode 191 and the light absorption layer 181 and then patterned to form the protrusion 185 and a pixel electrode covering pattern 187. Here, the protrusion 185 may be formed according to various methods such as an imprinting method, a photolithography method, a gravure method, and the like.

Figure 15:
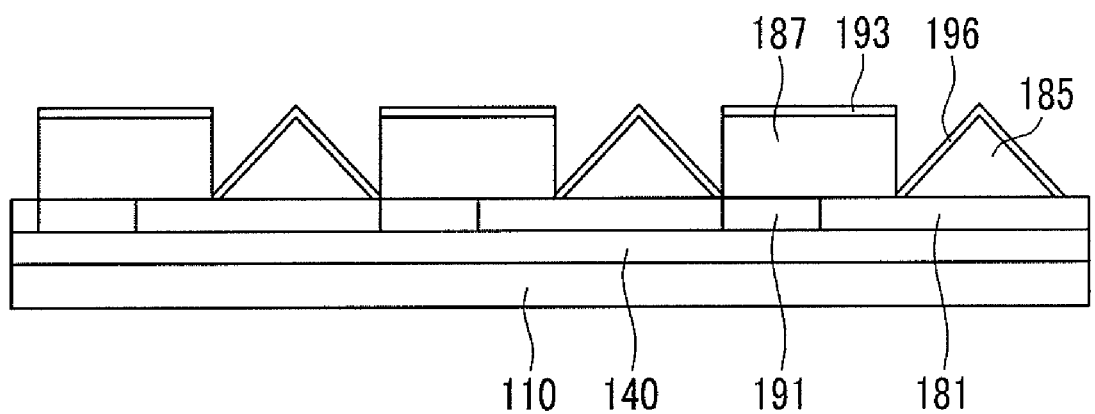

Thereafter, as shown in FIG. 15, the white reflection film is formed by depositing a powder such as silicon oxide ($SiO_2$), aluminum oxide ($Al_2O_3$), or the like. The white reflection film is formed as the diffusive reflection layer 196 on the protrusion 185, and is also formed on the pixel electrode covering pattern 187.

In FIG. 15, a material 193 stacked on the pixel electrode covering pattern 187 may be formed only on the upper surface of the pixel electrode covering pattern 187, but in the actual process, the material 193 may also be stacked on the side. In this case, a step of etching the material 193 formed on the side to remove it may be additionally performed (see FIG. 26).

Figure 16:
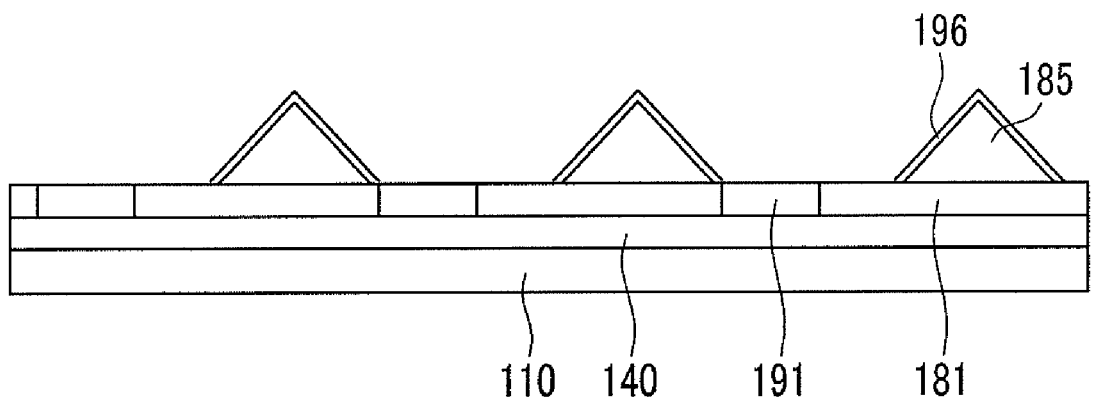

Thereafter, as shown in FIG. 16, the insulating material used for forming the protrusion 185 and the material 193 formed on the protrusion 185 are removed by using a lift-off process or the like. In this case, because the protrusion 185 is covered by the white reflection film 196, it is not removed, while the pixel electrode covering pattern 187 is removed to expose the pixel electrode 191.

A method of forming the respective layers on the upper substrate 210 will now be described.

FIGS. 17 to 20 show a method of forming the respective layers on the upper substrate of the display device according to the embodiment of FIG. 12.

Figure 17:
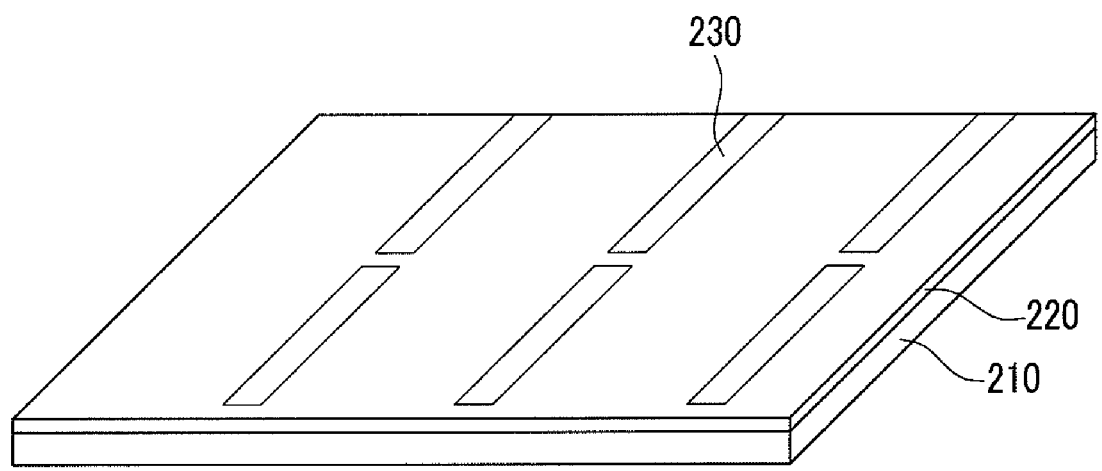
FIGS. 17 to 20 show a method of forming each layer on an upper substrate of the display device according to the embodiment of FIG. 12.

FIG. 17 shows the black matrix 220 and the color filter 230 formed on the upper substrate 210. The color filter 230 is formed at a position corresponding to the reflection face of the structure including the protrusion 185 and the diffusive reflection layer 196 when the upper substrate 210 and the lower substrate 110 are combined, and allows light reflected from the reflection face to mostly pass therethrough. The black matrix 220 is formed at a region where the color filter 230 is not formed, and absorbs light incident to the black matrix.

Figure 18:
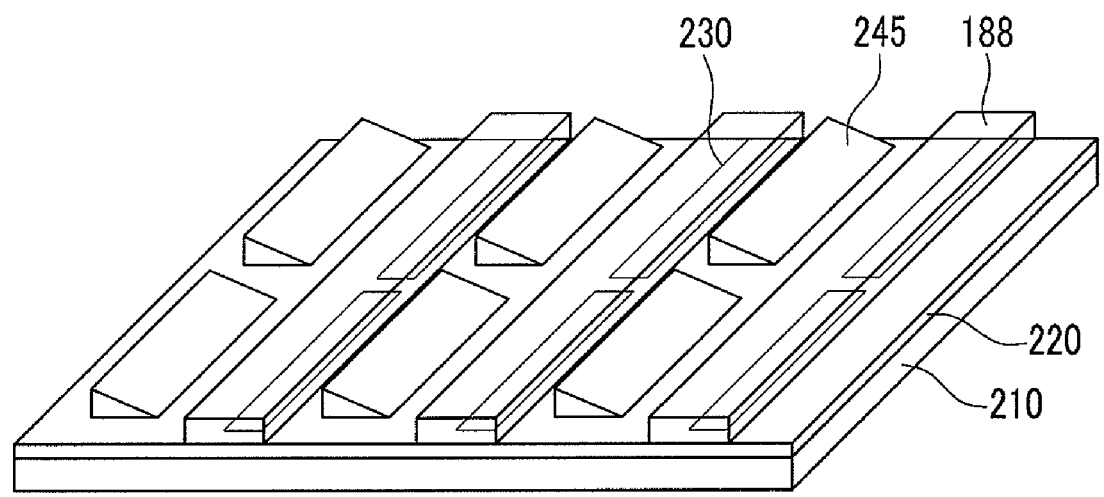
Figure 20:
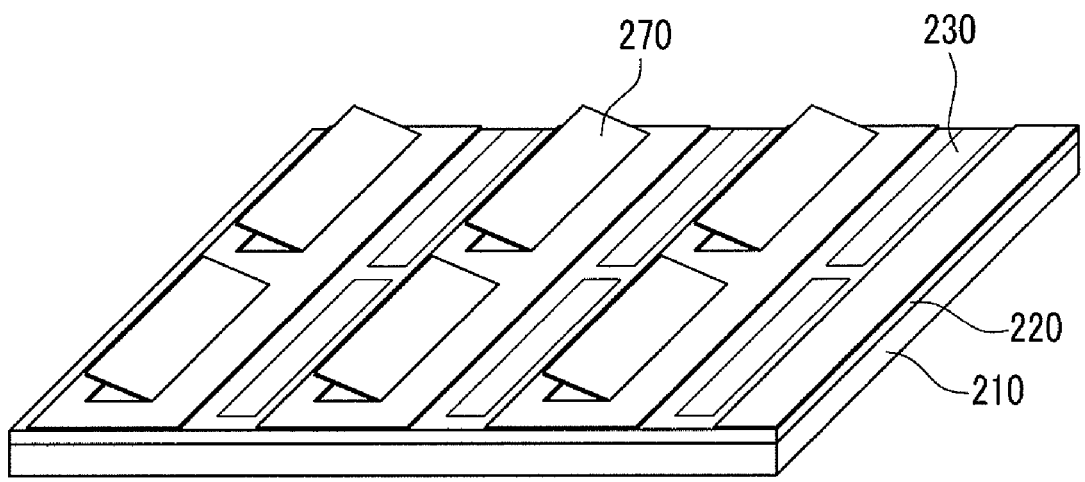

With reference to FIG. 18, an insulating material is stacked on the black matrix 220 and the color filter 230 and then patterned to form an electrode structure 245 and a color filter covering pattern 188 at positions where the micro-shutter electrode 270 is to be formed. The electrode structure 245 has a triangular sectional structure with a long hypotenuse and a vertical side. The vertical side of the electrode structure 245 may be excessively etched through overetching to have a reverse-tapered structure. This is because a metal material should not be stacked on the vertical side when the electrode structure 245 is removed, as shown in FIG. 20. For the reverse-tapered structure, the electrode structure 245 may be additionally dry-etched after being patterned. Alternatively, the electrode structure 245 may be formed to not have a reverse-tapered structure.

In this case, the material stacked on the electrode structure 245 may be formed only on the longer inclined plane of the electrode structure 245, but in the actual process, it may be formed on the shorter inclined plane. In this case, a step of etching the layer formed on shorter inclined plane to remove it may be additionally performed (see FIG. 26).

Figure 19:
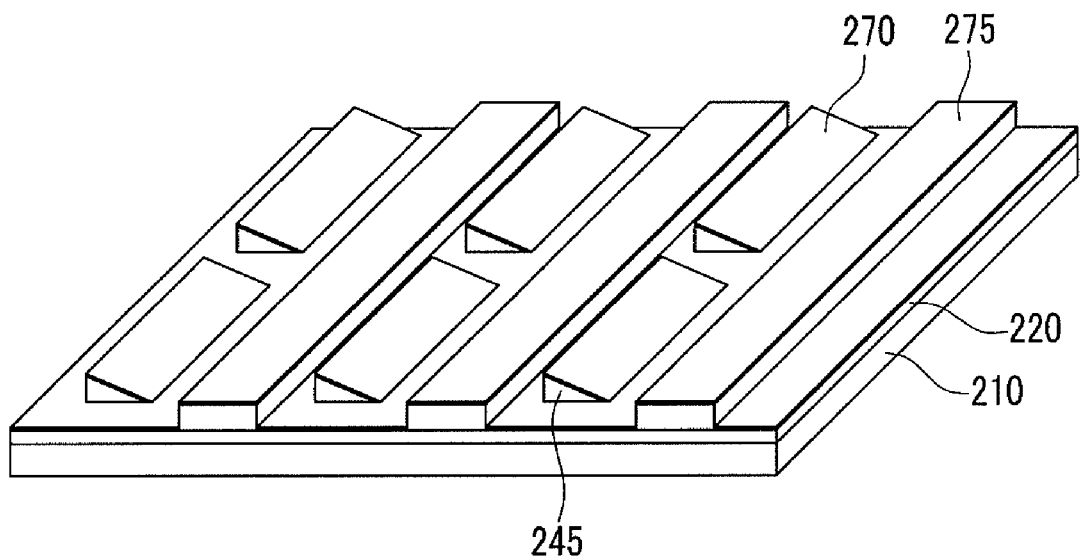

Thereafter, as shown in FIG. 19, a metal material is stacked to form the micro-shutter electrode 270 and a layer 275. The micro-shutter electrode 270 is formed on the long inclined plane of the electrode structure 245.

Thereafter, as shown in FIG. 20, the electrode structure 245 and the color filter covering pattern 188 made of the insulating material are removed by using a lift-off process or the like. The exposed electrode structure 245 and the color filter covering pattern 188 are completely removed. The electrode structure 245 formed under the micro-shutter electrode 270 is removed to allow the micro-shutter electrode 270 to move.

A method of representing gray levels in the display device formed according to the above-described method will now be described with reference to FIGS. 21 to 23.

Figure 21:
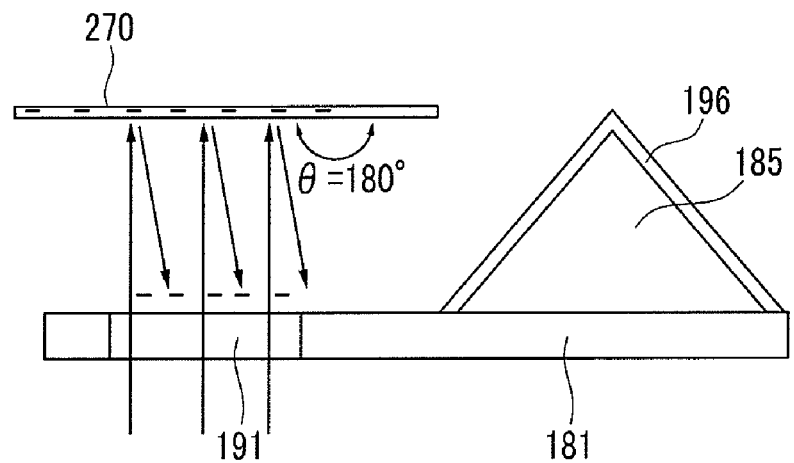
FIG. 21 is a cross-sectional view showing a state of the micro-shutter electrode when black is displayed according to the embodiment of FIG. 12.
Figure 22:
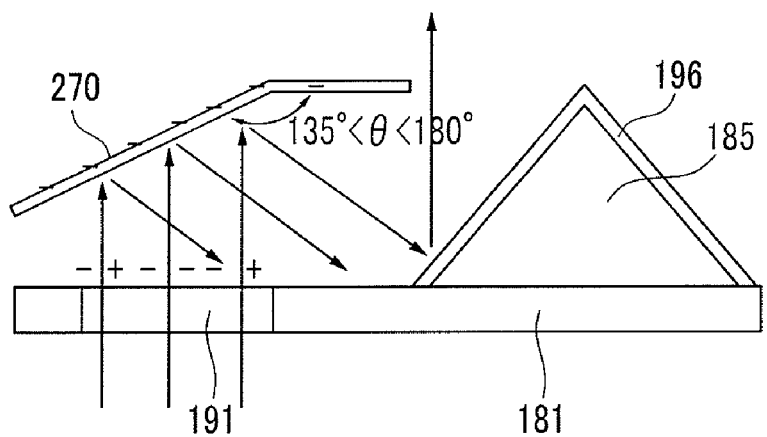
FIG. 22 is a cross-sectional view showing a state of the micro-shutter electrode when a certain level of gray scale is represented according to the embodiment of FIG. 12.
Figure 23:
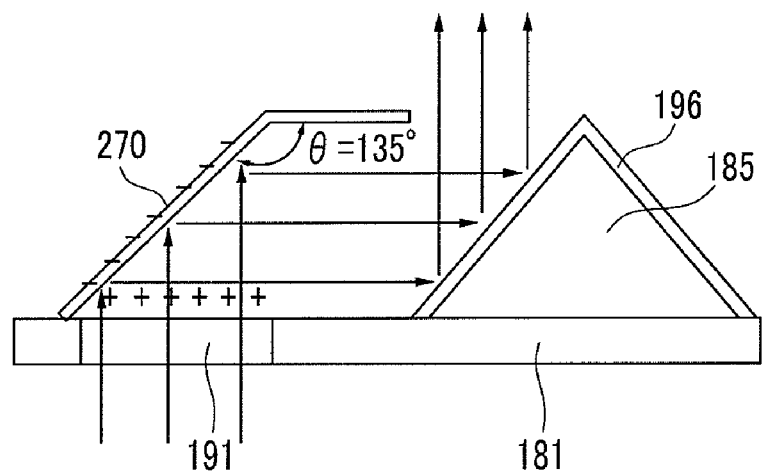
FIG. 23 is a cross-sectional view showing a state of the micro-shutter electrode when white is displayed in the embodiment of FIG. 12.

FIG. 21 is a cross-sectional view showing a state of the micro-shutter electrode when black is displayed according to the embodiment of FIG. 12, FIG. 22 is a cross-sectional view showing a state of the micro-shutter electrode when a gray level is displayed according to the embodiment of FIG. 12, and FIG. 23 is a cross-sectional view showing a state of the micro-shutter electrode when white is displayed in the embodiment of FIG. 12.

First, FIG. 21 shows displaying of black.

The micro-shutter electrode 270 is positioned to be as close as possible to the upper substrate 210 due to electromagnetic repulsive force between the micro-shutter electrode 270 and the pixel electrode 191. Hereinafter, this is called a case where the micro-shutter electrode 270 is closed. As a result, light emitted from the backlight unit 300 transmits through the pixel electrode 191 but is mirror-reflected by the micro-shutter electrode 270 to be transmitted back through the pixel electrode 191 or to be incident to the light absorption layer 181 to be absorbed therein. As a result, light cannot proceed upwardly. Thus, there is no light emitted at the upper portion of the display device, and accordingly, black is displayed.

FIGS. 22 and 23 show the micro-shutter electrode 270 which is open to display a gray level of gray scale or white, respectively.

In a display device according to an embodiment of the present invention, gray levels may be displayed depending on the degree of opening of the micro-shutter electrode 270 according to an electrostatic force between the micro-shutter electrode 270 and the pixel electrode 191. When the micro-shutter electrode 270 is slightly open as shown in FIG. 22, light that has passed through the pixel electrode 191 is reflected from the micro-shutter electrode 270, of which only a portion is incident on the diffusive reflection layer 196 to be upwardly discharged at less than a maximum luminance. An image is displayed with the discharged light. Meanwhile, light that is not emitted to outside is mostly incident to the light absorption layer 181 to be absorbed therein.

When the micro-shutter electrode 270 is completely open as shown in FIG. 23, light that has passed through the pixel electrode 191 is reflected from the micro-shutter electrode 270 to be incident to the diffusive reflection layer 196 and then upwardly discharged. As a result, a maximum luminance (white) is displayed. When white is displayed, a repulsive electrostatic force is maximized between the micro-shutter electrode 270 and the pixel electrode 191. FIG. 23 shows an exemplary open angle of 135° at which the micro-shutter electrode 192 is maximally open, but the angle may vary according to other embodiments of the invention.

FIGS. 21 to 23 show the micro-shutter electrode 270 negatively charged, but without being limited thereto, the micro-shutter electrode 270 may be positively charged according to other embodiments of the invention. Different charges may be applied to the micro-shutter electrode 270 and the pixel electrode 191 to display white, and the same charges may be applied to the pixel electrode 191 and micro-shutter electrode 270 to display black.

Figure 24:
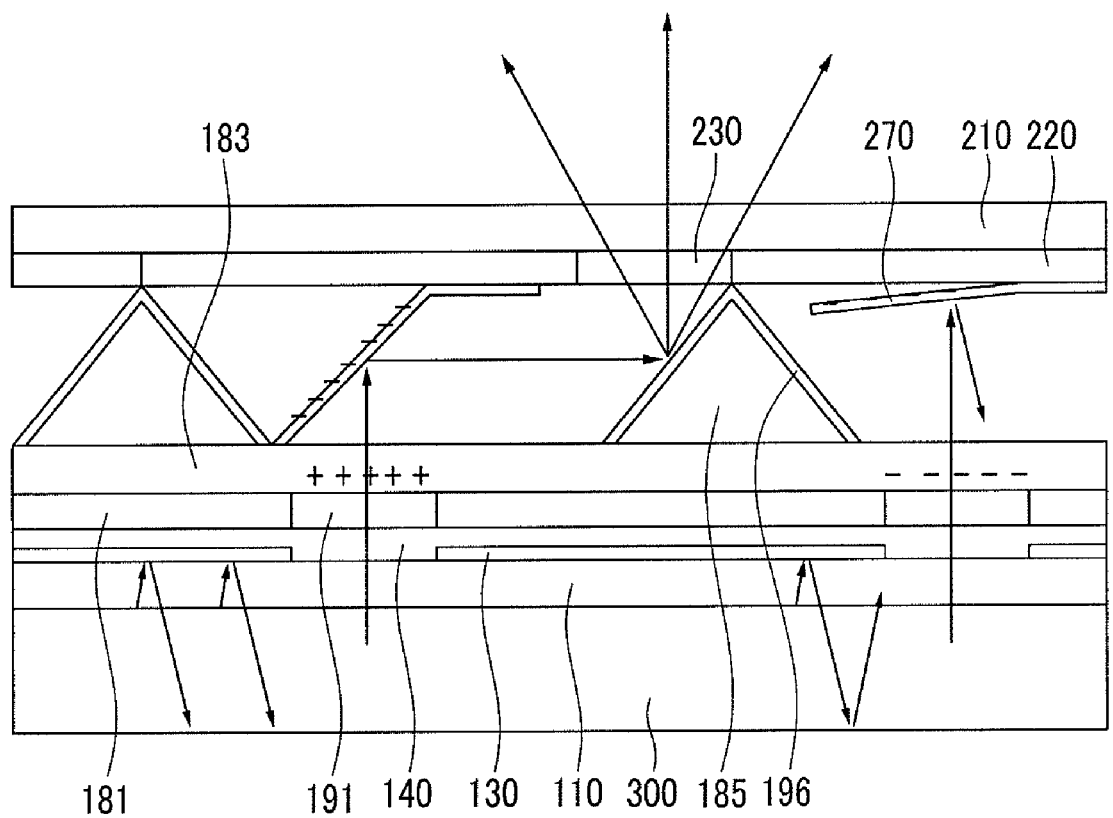
FIG. 24 is a cross-sectional view of the display device according to another embodiment of the present invention.
Figure 25:
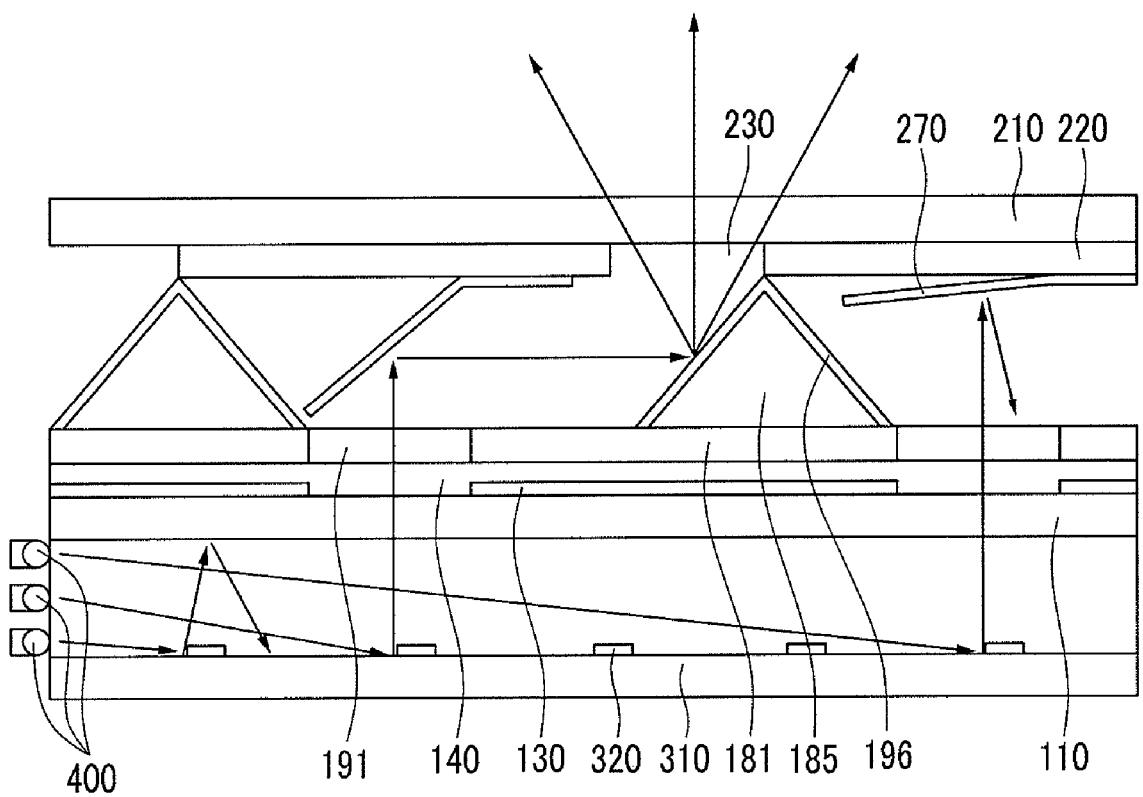
FIG. 25 is a cross-sectional view of the display device according to another embodiment of the present invention.

FIGS. 24 and 25 show other embodiments of the present invention.

FIG. 24 is a cross-sectional view of a display device according to yet another embodiment of the present invention.

Unlike the embodiment of FIG. 12, in the embodiment as shown in FIG. 24, an upper insulating layer 183 is formed on the pixel electrode 191 and the light absorption layer 181. The upper insulating layer 183 prevents the pixel electrode 191 and the micro-shutter electrode 270 from being electrically connected when the micro-shutter electrode 270 is completely open.

The display device as shown in FIG. 24 may be divided into the display panel and the backlight unit 300. The display panel includes the lower substrate 110 and the upper substrate 210 formed at the outermost portions thereof, and the thin film transistor (not shown), the pixel electrode 191, the diffusive reflection layer 196, the micro-shutter electrode 270, the color filter 230, the black matrix 220, and the like, are formed between the lower substrate 110 and the upper substrate 210. The backlight unit 300 necessarily includes a light source, and may further include a light guide plate (not shown), a reflection plate (not shown), and the like, according to other embodiments of the invention.

A display panel according to an embodiment of the present invention will now be described in detail.

A display panel according to an embodiment of the present invention includes the upper substrate 210 and the lower substrate 110.

A light-recycle layer 130 is formed on the lower substrate 110. The light-recycle layer 130 blocks light emitted from the backlight unit 300 that is incident to an unused portion of the display after being, and returns it to the backlight unit 300. The light returned to the backlight unit 300 is again reflected from the reflection plate (not shown) of the backlight unit 300 to be incident to the display panel again. Thus, light efficiency can be increased. The light-recycle layer 130 may be formed as a metal layer or as a white reflection film formed by depositing a powder such as silicon oxide ($SiO_2$), aluminum oxide ($Al_2O_3$), or the like. The white reflection film has better reflection efficiency than the metal layer.

In addition to the light-recycle layer 130, a gate line (not shown), a data line (not shown), and a thin film transistor (TFT) (not shown) are formed on the lower substrate 110. The light-recycle layer 130 may be formed together when the gate line and the data line are formed, and the gate line and the data line may also serve as the light-recycle layer 130 according to other embodiments of the invention.

The insulating layer 140 is formed to cover the gate line, the data line, the TFT, and the light-recycle layer 130, and includes a contact hole (not shown) exposing a drain electrode of the TFT.

The pixel electrode 191 is formed on the insulating layer 140 and connected with the TFT via the contact hole. The pixel electrode 191 is formed as a transparent conductor such as indium tin oxide (ITO), indium zinc oxide (IZO), or the like.

The light absorption layer 181 is formed on the insulating layer 140 at a region where the pixel electrode 191 is not formed. The light absorption layer 181 may be formed with the same material as the black matrix 220 of the upper substrate 210, and absorbs incident light.

The upper insulating layer 183 is formed on the pixel electrode 191 and the light absorption layer 181. The upper insulating layer 183 prevents the pixel electrode 191 from being electrically connected with the micro-shutter electrode 270.

The protrusion 185 and the diffusive reflection layer 196 are formed on the light insulating layer 183 at an upper portion of the upper insulating layer 183.

The protrusion 185 is made of an insulating material, and has a triangular cross section with at least one hypotenuse. Although the section has the triangular cross section, the side (i.e., the right inclined plane of the protrusion 185 in FIG. 24) that is not used for an image display is not sloped. On the other hand, the side (i.e., the left inclined plane of the protrusion 185 in FIG. 24, hereinafter referred to as a "reflection face") used for displaying an image may be an inclined plane formed at an angle. The reflection face may have various shapes according to other embodiments of the invention.

The diffusive reflection layer 196 is formed on the protrusion 185. Unlike a mirror-reflection to reflect incident light in one direction, the diffusive reflection layer 196 can distributedly reflect incident light in various directions. As a result, a viewing angle of the display device can be improved. The diffusive reflection layer 196 may be formed as a white reflection film obtained by depositing a powder such as silicon oxide ($SiO_2$) or aluminum oxide ($Al_2O_3$).

The structure including the protrusion 185 and the diffusive reflection layer 196 may serve as a spacer that uniformly maintains the space with the upper substrate 210 as shown in FIG. 24, and an extra spacer may be additionally formed according to other embodiments of the invention.

The black matrix 220, the color filter 230, and the micro-shutter electrode 270 are formed on the upper substrate 210.

The color filter 230 is formed at a position corresponding to the reflection face of the structure including the protrusion 185 and the diffusive reflection layer 196, and allows light reflected from the reflection face to mostly pass therethrough. In addition, the color filter 230 adds a color to the light that passes therethrough.

The black matrix 220 is formed at a region where the color filter 230 is not formed, blocks light incident from the outside, and eliminates light that is not required for image display.

The micro-shutter electrode 270 is formed under the black matrix 220. The micro-shutter electrode 270 is not formed on the color filter 230.

The micro-shutter electrode 270 is formed at an upper region of the pixel electrode 191, and may be moved by the electrostatic force with the pixel electrode 191. In this case, the micro-shutter electrodes 270 may be opened or closed at the upper region of the pixel electrodes 191. The micro-shutter electrode 270 may be formed as a thin metal layer to mirror-reflect light that has passed through the transparent pixel electrode 191. White (or a maximum luminance of a corresponding color) or black may be displayed according to the opening/closing degree of the micro-shutter electrode 270.

The backlight unit 300 is similar to that of the LCD, so the backlight unit used in the LCD can also be used as is. In this respect, a film is not required below the lower substrate 110, reducing fabrication unit cost compared with the LCD.

FIG. 25 is a cross-sectional view of a display device according to another embodiment of the present invention.

Unlike the backlight unit 300 that emits white light in FIG. 12, the display device as shown in FIG. 25 discriminates the blue, green, and red colors and emits light of each color for a certain time. Specifically, blue light is emitted during a first time period, green light is emitted during a next time period, and then blue light is emitted during the following time period. The time period duration is short, and light of each color is added to allow a color image to be visible.

The display device as shown in FIG. 25 may be divided into the display panel and the backlight unit 300. The display panel includes the lower substrate 110 and the upper substrate 210 formed at the outermost portions thereof, and the thin film transistor (not shown), the pixel electrode 191, the diffusive reflection layer 196, the micro-shutter electrode 270, the black matrix 220, and the like, are formed between the lower substrate 110 and the upper substrate 210. The backlight unit 300 necessarily includes a light source, and may further include a light guide plate (not shown), a reflection plate (not shown), and the like, according to other embodiments of the invention.

A display panel according to an embodiment of the present invention will now be described in detail.

A display panel according to an embodiment of the present invention includes the upper substrate 210 and the lower substrate 110.

The light-recycle layer 130 is formed on the lower substrate 110. The light-recycle layer 130 blocks light emitted from the backlight unit 300 that is incident to an unused portion of the display, and returns it to the backlight unit 300. The light incident to the backlight unit 300 is again reflected from the reflection plate (not shown) of the backlight unit 300 to be incident to the display panel again. Thus, light efficiency can be increased. The light-recycle layer 130 may be formed as a metal layer or as a white reflection film formed by depositing a powder such as silicon oxide ($SiO_2$), aluminum oxide ($Al_2O_3$), or the like. The white reflection film has better reflection efficiency than the metal layer.

In addition to the light-recycle layer 130, a gate line (not shown), a data line (not shown), and a thin film transistor (TFT) (not shown) are formed on the lower substrate 110. The light-recycle layer 130 may be formed together when the gate line and the data line are formed, and the gate line and the data line may also serve as the light-recycle layer 130 according to other embodiments of the invention.

The insulating layer 140 is formed to cover the gate line, the data line, the TFT, and the light-recycle layer 130, and includes a contact hole (not shown) exposing a drain electrode of the TFT.

The pixel electrode 191 is formed on the insulating layer 140 and connected with the TFT via the contact hole. The pixel electrode 191 is formed as a transparent conductor such as indium tin oxide (ITO), indium zinc oxide (IZO), or the like.

The light absorption layer 181 is formed at a region on the insulating layer 140 where the pixel electrode 191 is not formed. The light absorption layer 181 may be formed with the same material as the black matrix 220 of the upper substrate 210, and absorbs incident light.

The protrusion 185 and the diffusive reflection layer 196 are formed on the light absorption layer 181.

The protrusion 185 is made of an insulating material, and has a triangular structure with at least one hypotenuse. Although the section has a triangular structure, the side (i.e., the right inclined plane of the protrusion 185 in FIG. 25) that is not used for an image display is not sloped. On the other hand, the side (i.e., the left inclined plane of the protrusion 185 in FIG. 25, hereinafter referred to as a "reflection face") used for displaying an image may be an inclined plane formed at an angle. The reflection face may have various shapes according to other embodiments of the invention.

The diffusive reflection layer 196 is formed on the protrusion 185. Unlike a mirror-reflection to reflect incident light in one direction, the diffusive reflection layer 196 can distributedly reflect incident light in various directions. As a result, a viewing angle of the display device can be improved. The diffusive reflection layer 196 may be formed as a white reflection film obtained by depositing a powder such as silicon oxide ($SiO_2$) or aluminum oxide ($Al_2O_3$).

The structure including the protrusion 185 and the diffusive reflection layer 196 may serve as a spacer that uniformly maintains the space with the upper substrate 210 as shown in FIG. 25, and an extra spacer may be additionally formed according to other embodiments of the invention.

The black matrix 220 and the micro-shutter electrode 270 are formed on the upper substrate 210.

In an exemplary embodiment of the invention, there is no need to form a color filter, because the backlight unit 300 emits light of each color. Thus, the portion where the color filter is generally formed is empty and the black matrixes 220 are formed at other regions.

The black matrix 220 blocks light from the outside and removes light that is not required for image display.

The micro-shutter electrode 270 may be formed under the black matrix 220. The micro-shutter electrode 270 may be formed on the black matrix 220.

The micro-shutter electrode 270 is formed at an upper region of the pixel electrode 191, and may be moved by the electrostatic force with the pixel electrode 191. In this case, the micro-shutter electrodes 270 may be opened or closed at the upper region of the pixel electrodes 191. The micro-shutter electrode 270 may be formed as a thin metal layer to mirror-reflect light that has passed through the transparent pixel electrode 191. White (or a maximum luminance of a corresponding color) or black may be displayed according to the opening/closing degree of the micro-shutter electrode 270.

The backlight unit 300 includes blue, green, and red light sources 400, and emits light of the colors at different time intervals. Specifically, the backlight unit 300 emits blue light during a first time period, emits green light during a next time period, and then emits blue light during the following time period. The time period duration is short, and light of each color is added to allow a color image to be visible.

Such backlight unit 300 can be applicable to the embodiment of FIG. 1, and may be used to replace the structure with the color filter 230 in the embodiment of FIG. 1.

FIGS. 8 to 10 and FIGS. 21 to 23 show a method of displaying gray levels of the display device according to embodiments of the present invention. As shown in the drawings, to adjust the gray levels, the opening/closing degree of the micro-shutter electrodes 192 and 270 are adjusted. The opening/closing of the micro-shutter electrodes 192 and 270 relies on the electrostatic force with the pixel electrode 191, and in this case, it may be challenging to control the thin micro-shutter electrodes 192 and 270. In such a case, the gray levels can be displayed in the following manner.

Specifically, a single frame is divided into a plurality of intervals, and the micro-shutter electrodes 192 and 270 are open during the intervals according to the corresponding gray levels and are closed in the remaining intervals. For example, if 64 gray levels are displayed, one frame is divided into 63 intervals, and when black is displayed, the micro-shutter electrodes 192 and 270 are all closed, and when a gray level of 1 is represented, the micro-shutter electrodes 192 and 270 are completely open during one interval. More gray levels can be expressed by increasing the number of open intervals of the micro-shutter electrodes 192 and 270. Accordingly, the amount of exposed light during one frame can be controlled to display gray levels.

Figure 26:
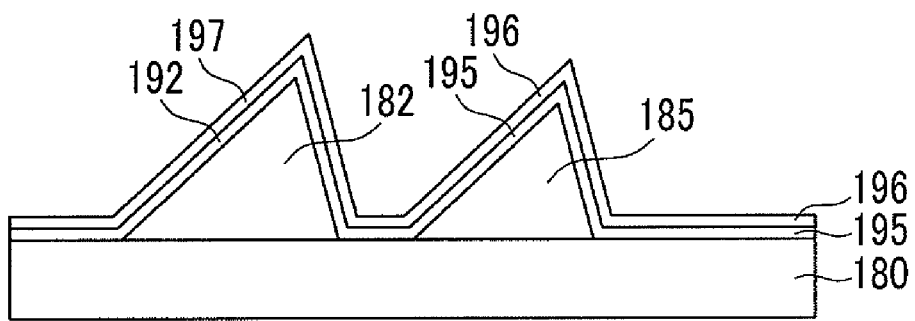
FIG. 26 shows a method of forming an electrode structure and a shutter electrode on a lower substrate of the display device according to another embodiment of the present invention.
Figure 26:
Figure 26:
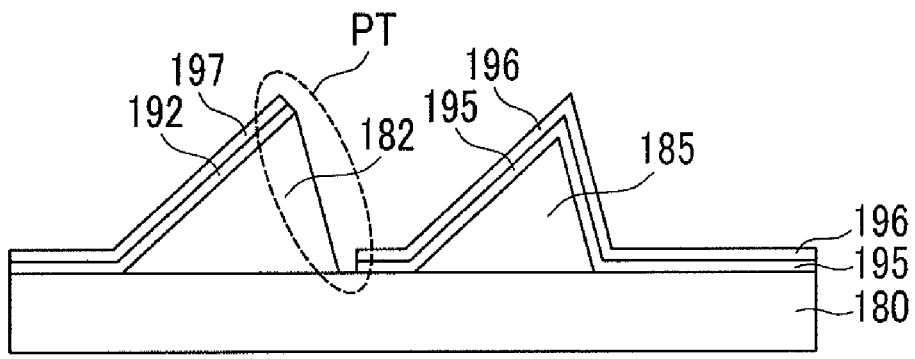
Figure 26:
Figure 26:
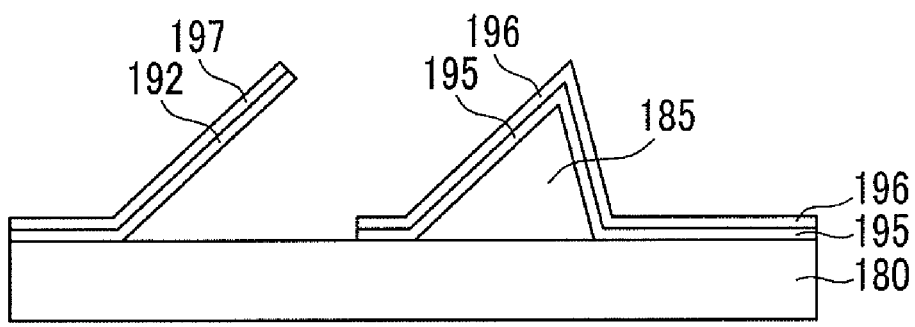

FIG. 26 shows a method of forming an electrode structure and a shutter electrode on the lower substrate of a display device according to another embodiment of the present invention.

Unlike the embodiment shown in FIGS. 3 to 7, an additional step of etching a layer stacked on the shorter inclined plane of the electrode structure 182 is performed.

First, like those as shown in FIGS. 3 and 4, the protrusion 185 and the electrode structure 182 are already formed, and a metal material and a material for the white reflection film are stacked to form the micro-shutter electrode 192 as shown in FIG. 26(a). As noted in FIG. 26(a), the metal material and the material for the white reflection film are also stacked on the shorter inclined plane of the electrode structure 182.

Next, as shown in FIG. 26(b), the metal layer on the shorter inclined plane of the electrode structure 182 is selectively etched through photolithography or the like. The etched region is indicated by "PT" in FIG. 26(b).

Then, as shown in FIG. 26(c), the electrode structure 182 is removed by reflowing or the like. Thus, an erroneous formation of the micro-shutter electrode 192 can be prevented in advance.

In FIG. 26, the electrode structure 182 is subjected to reflow, but other layers (e.g., the pixel electrode covering pattern 187) may be partially removed through etching in a step previous to the reflow.

Figure 27:
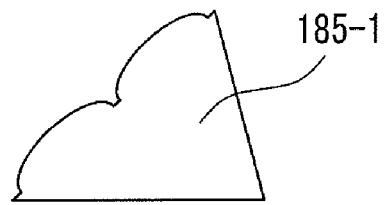
FIG. 27 shows a protrusion according to another embodiment of the present invention.

FIG. 27 shows a protrusion according to another embodiment of the present invention.

The protrusion 185-1 according to the embodiment as shown in FIG. 27 has an embossed reflection face. That is, the reflection face of the protrusion 185-1 includes depressed portions and embossed portions (protrusions and depressions). The protrusions and depressions formed on the reflection face facilitate a diffusive reflection, so the white reflection film may not need to be formed on the protrusion 185-1. The protrusion 185-1 according to the embodiment of FIG. 27 may be formed in various manners, and can be easily formed by changing the design of a mold used for imprinting. Only two depressed portions and embossed portions are shown in FIG. 27, but various numbers and patterns of depressed portions and embossed portions can be formed and their size can be varied according to other embodiments of the invention.

Figure 28:
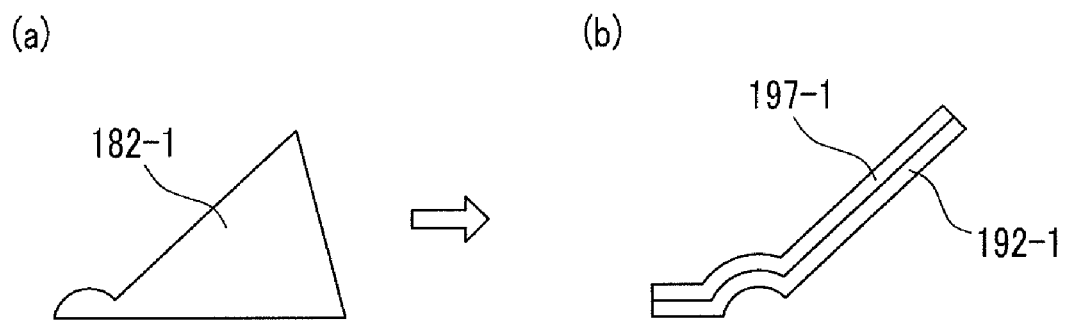
FIGS. 28 and 29 show micro-shutter electrodes according to another embodiment of the present invention.
Figure 29:
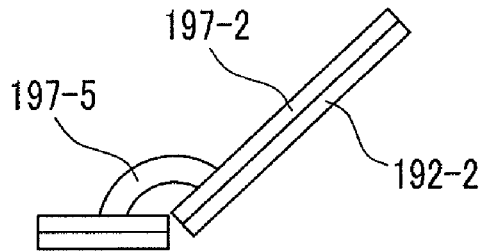

FIGS. 28 and 29 show micro-shutter electrodes according to another embodiment of the present invention.

The micro-shutter electrodes should have a structure that moves subject to an electrostatic force. Thus, a fixed end (its opposite end is called a free end) of the micro-shutter electrode is frequently stressed. FIGS. 28 and 29 show a structure for reducing stress on the fixed end of the micro-shutter electrode 192-1.

First, FIG. 28 shows an exemplary embodiment in which a convex structure is added to the fixed end of the micro-shutter electrode 192-1. FIG. 28(a) shows an electrode structure 182-1 for forming the micro-shutter electrode 192-1 of FIG. 28, and FIG. 28(b) shows the micro-shutter electrode 192-1.

As shown in FIG. 28(a), the electrode structure 182-1 is formed to have a protrusion structure at the side of the fixed end of the micro-shutter electrode 192-1. Then, after a metal material and a material for the white reflection film are stacked, the electrode structure 182-1 is removed through reflow to form the micro-shutter electrode 192-1 with the convex structure as shown in FIG. 28(b).

As a result, although the micro-shutter electrode 192-1 moves, stress applied to the fixed end thereof can be reduced owing to the protrusion structure.

FIG. 29 shows another structure for removing stress.

With reference to FIG. 29, a fixed end of a micro-shutter electrode 192-2 is cut and fixed to the substrate by using a connection ring 197-5 made of an elastic material such as silicon. Because the micro-shutter electrode 192-2 is already separated, the micro-shutter electrode 192-2 itself is not stressed, while the connection ring 197-5 made of silicon or the like is stressed instead. In this respect, however, silicon is more resistant to stress compared with a metallic material, so the performance and life span of the display device can be improved.

Figure 30:
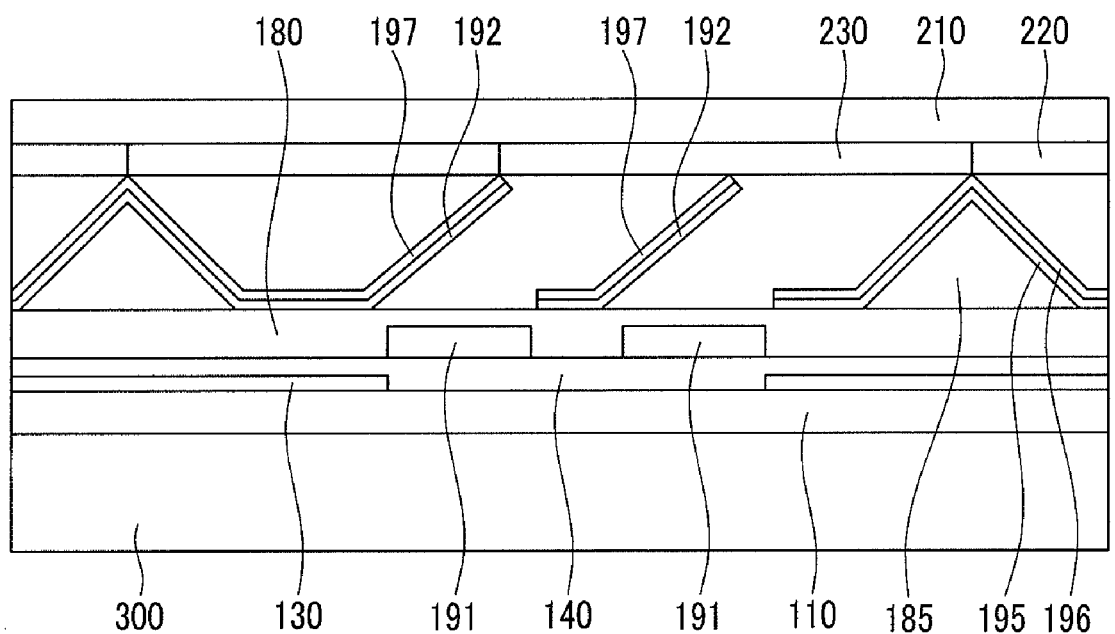
FIG. 30 is a cross-sectional view of a display device according to another embodiment of the present invention.

FIG. 30 is a cross-sectional view of a display device according to another embodiment of the present invention.

The display device as shown in FIG. 30 is similar to that of the embodiment as shown in FIG. 1, but unlike the embodiment of FIG. 1, the display device according to the embodiment as shown in FIG. 30 includes two micro-shutter electrodes 192 in a single pixel. Two pixel electrodes 191 are formed to correspond thereto.

With the structure as shown in FIG. 30, because two micro-shutter electrodes 192 are formed, the two micro-shutter electrodes 192 can be adjusted to represent gray levels, so gray level display can have a higher resolution. In addition, the display device can have a higher aperture ratio to improve performance.

Although FIG. 30 shows two micro-shutter electrodes in the single pixel, three or more micro-shutter electrodes may also be formed according to other embodiments of the invention.

The structure of FIG. 30 is a modification of the structure of FIG. 1, and the structure of FIG. 12 may have two or more micro-shutter electrodes for a single pixel electrode.

As described above, a display device using the micro-shutter electrode can not only be used in an active mode in which signals are transferred by using switching elements formed at respective pixels, but also in a passive mode in which a horizontal axis and a vertical axis of pixels are selected to select crossed pixels and apply voltage thereto without a switching element for each pixel.

While embodiments of this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A display device comprising:
   a first substrate;
   a pixel electrode formed on the first substrate and made of a transparent conductive material;
   a protrusion formed to be adjacent to the pixel electrode and having a reflection face;
   a diffusive reflection layer formed on the protrusion and diffusively reflecting incident light; and
   a micro-shutter electrode that is moved by an electrostatic force with the pixel electrode and reflecting incident light to the reflection face of the diffusive reflection layer in an open state to display an image, wherein the diffusive reflection layer is formed as a white reflection film obtained by depositing a powder selected from silicon oxide or aluminum oxide.

2. The device of claim 1, wherein the micro-shutter electrode comprises a fixed end formed with a convex structure.

3. The device of claim 1, wherein the micro-shutter electrode comprises a fixed end, and the fixed end is connected to the first substrate by a connection ring.

4. The device of claim 1, further comprising
   a backlight unit comprising a light source at an outer side of the first substrate.

5. The device of claim 4, further comprising
   a light-recycle layer formed below the pixel electrode and the protrusion on the first substrate to reflect incident light to the backlight unit.

6. The device of claim 5, wherein the light-recycle layer is made of a metal or is formed as a white reflection film obtained by depositing a powder selected from silicon oxide or aluminum oxide.

7. The device of claim 1, wherein the micro-shutter electrode is positioned above the pixel electrode on the first substrate.

8. The device of claim 7, further comprising
   a layer made of the same material as that of the diffusive reflection layer on the micro-shutter electrode.

9. The device of claim 8, further comprising
   a layer formed between the protrusion and the diffusive reflection layer and made of the same material as that of the micro-shutter electrode.

10. The device of claim 9, further comprising
    a light absorption layer formed on the first substrate where the pixel electrode is not formed.

11. A method for manufacturing a display device, the method comprising:
    coating an insulation material on a first substrate and patterning the insulation material to form an electrode structure having a protrusion with a reflection face at a side of the electrode structure;
    stacking a metal layer on the electrode structure and the protrusion;
    forming a white reflection film on the electrode structure and the protrusion after stacking the metal layer on the electrode structure and before lifting-off the electrode structure; and
    lifting off the electrode structure.

12. The method of claim 11 further comprising
    removing the metal layer formed on an inclined plane of the electrode structure after stacking the metal layer and before lifting-off the electrode structure.

13. The method of claim 11, further comprising
    removing the metal layer and the white reflection film formed on an inclined plane of the electrode structure after forming the white reflection film and before lifting-off the electrode structure.

14. The method of claim 11, wherein the protrusion is formed with a depression portion and an embossed portion on the reflection face of the protrusion.

15. The method of claim 11, wherein the white reflection film is formed by depositing a powder selected from silicon oxide or aluminum oxide.

16. The method of claim 11, further comprising forming a color filter covering pattern for covering the color filter at a side of the electrode structure, and stacking the metal layer on the color filter covering pattern.

17. A method for manufacturing a display device, the method comprising:
    coating an insulation material on a first substrate and patterning the insulation material to form an electrode structure;
    stacking a metal layer on the electrode structure;
    lifting off the electrode structure;
    coating an insulation material on a second substrate facing the first substrate and patterning the coated insulation material to form the protrusion and the pixel electrode covering pattern;
    forming a white reflection film on the protrusion and the pixel electrode covering pattern; and
    lifting off the pixel electrode covering pattern.

18. The method of claim 11, wherein the electrode structure comprises a protrusion structure formed at one end thereof.

* * * * *